(12) United States Patent
Bankes

(10) Patent No.: US 8,335,755 B1
(45) Date of Patent: Dec. 18, 2012

(54) DERIVED CONTEXTS FOR COMPUTATIONAL EXPERIMENTS

(75) Inventor: Steven C. Bankes, Los Angeles, CA (US)

(73) Assignee: Evolving Logic, Topanga, CA (US)

( * ) Notice: Subject to any disclaimer, the term of this patent is extended or adjusted under 35 U.S.C. 154(b) by 1307 days.

(21) Appl. No.: 11/962,008

(22) Filed: Dec. 20, 2007

Related U.S. Application Data

(63) Continuation of application No. 10/947,761, filed on Sep. 23, 2004, now abandoned.

(60) Provisional application No. 60/505,387, filed on Sep. 23, 2003.

(51) Int. Cl.
*G06F 17/00* (2006.01)
*G06N 5/00* (2006.01)

(52) U.S. Cl. .................. 706/47; 715/232; 455/461

(58) Field of Classification Search ............ 706/47
See application file for complete search history.

(56) References Cited

U.S. PATENT DOCUMENTS

| | | | |
|---|---|---|---|
| 6,233,570 B1 * | 5/2001 | Horvitz et al. ............ | 706/11 |
| 6,272,444 B1 * | 8/2001 | Thevoux-Chabuel et al. ............ | 702/179 |
| 6,389,380 B1 | 5/2002 | Bankes | |
| 2006/0031288 A1 * | 2/2006 | Ter Horst et al. ............ | 709/204 |

OTHER PUBLICATIONS

Steve Bankes, *Exploratory Modeling for Policy Analysis*, 41 Operations Research, No. 3, 435-449 (May-Jun. 1993).
Steven Bankes & James GKlogly, *Exploratory Modeling, Search Through Spaces of Computational Experiments*, Proceedings of the Third Annual Conference on Evolutionary Programming 353-60 (Anthony V. Sebald & Lawrence J. Fogel eds. 1994).
Steve Bankes & James Gillogly, *Validation of Exploratory Modeling*, Proceedings of the Conference on High Performance Computing 1994 382-87 (Adrian M. Tentner & Rick L Stevens eds. 1994) (San Diego, CA ).
Steven C. Bankes, *Computational Experiments and Exploratory Modeling*, 7 Chance No. 1, 50-51, 57 (1994).

* cited by examiner

*Primary Examiner* — Kakali Chaki
*Assistant Examiner* — Kalpana Bharadwaj
(74) *Attorney, Agent, or Firm* — Knobbe Martens Olson & Bear LLP

(57) ABSTRACT

A reasoning system includes at least one atomic context and a plurality of derivation methods. Each atomic context encapsulates a reference to at least one mathematical model and is configured to cause the performance of at least one computation using the encapsulated mathematical model. Each of the derivation methods is configured to receive a reference to a base context and to create a derived context that is based on the base context. Such created derived contexts are configured to cause the performance of a computation by invoking the base context and providing at least one input to the base context, to receive an output from the base context, to perform a transformation on an input to the base context or on an output from the base context, and to return at least one output of the computation. Derived contexts can be composed in order to create more complex contexts.

20 Claims, 40 Drawing Sheets

DERIVED CONTEXTS FOR COMPUTATIONAL EXPERIMENTS

PRIORITY INFORMATION

This application claims the benefit of U.S. Provisional Application No. 60/505,387, entitled "SOFTWARE ENVIRONMENT FOR DERIVING NEW CONTEXTS FOR COMPUTATIONAL EXPERIMENTATION FROM EXISTING ONES," which was filed Sep. 23, 2003. The foregoing provisional application is hereby incorporated in its entirety by this reference.

BACKGROUND OF THE INVENTION

1. Field of the Invention

Embodiments of the invention relate to reasoning systems and methods that perform computational experiments.

2. Description of the Related Art

FIG. 1 illustrates an atomic experimental context ("atomic context"). U.S. Pat. No. 6,389,380 describes an atomic context in detail. Herein is provided a summary of characteristics of an atomic context for ease of explanation in this application.

As illustrated, an atomic context 100 encapsulates one or more mechanisms or methods for driving a computational experiment. Such a mechanism can be, for example, a mathematical model. An atomic context 100 comprises a reference 104 to such a mathematical model 106, one or more interfaces 108 to the mathematical model, and one or more methods 110 for running operations on the mathematical model. The mathematical model 106, generally but not necessarily located externally to the atomic context, defines a computational experiment and computes answers to the experiment. The mathematical model can be defined using any tool configured to define mathematical models, including, for example, Microsoft Excel, SAS, Matlab, and the like. The atomic context 100 drives experiments using the mathematical model 106, such as by providing input variables to the mathematical model, changing the input values, and iteratively instructing the mathematical model to run the experiment and generate results. An atomic context may provide other services to other software objects as part of a given embodiment. To distinguish its primary function of conducting experiments from other methods that may be supported, henceforth the function of running experiments will be referred as being embodied by a "run method" supported by the atomic context.

As will be apparent to a skilled artisan, an atomic context 100 advantageously can change inputs to a mathematical model 106 and test multiple scenarios. Nevertheless, an atomic context 100 does not change the mathematical model 106 itself or transform the calculations performed by the mathematical model. This means that an atomic context 100 cannot cause a mathematical model 106 to return results that answer a question that has not already been coded in the mathematical model.

SUMMARY OF THE INVENTION

Embodiments of the systems and methods described herein build upon the computer aided reasoning system, atomic contexts, and the other concepts described in U.S. Pat. No. 6,389,380, entitled "SYSTEM AND METHOD FOR PERFORMING COMPOUND COMPUTATIONAL EXPERIMENTS," which was filed on Sep. 16, 1998, and issued on May 14, 2002, and which is hereby incorporated by reference in its entirety into this application. However, the systems and methods described herein preferably can transform a pre-existing mathematical model such that questions not hard-coded into the mathematical model can be answered using the model. Advantageously, therefore, the systems and methods described herein expand the capabilities of the computer aided reasoning system and the atomic contexts disclosed in U.S. Pat. No. 6,389,380.

Embodiments of the system described herein are generically referred to as a "computer aided reasoning system," or simply a "reasoning system." One commercial implementation of a computer aided reasoning system offered by Evolving Logic, Inc. is known as Computer Aided Reasoning system or CARs. Any references to CARs herein are provided merely as an example of a reasoning system and do not limit the scope of the invention.

Embodiments of the system and methods described herein allow for transformations of atomic contexts by providing a number of derivation methods. Each derivation method is configured to generate a derived experimental context ("derived context") from one or more other contexts. The other contexts can be atomic contexts or the other contexts can be derived contexts. Derived contexts can be recursively nested to an arbitrary number of levels.

Preferably, a derived context comprises one or more references to other contexts and one or more software mechanisms that perform computations as a result of the derived context receiving new inputs or information from other contexts that it has requested. Each derived context receives one or more inputs and returns one or more outputs. The other contexts that a derived context references are known herein as the derived context's "parent contexts" or "base contexts." A derived context preferably requests one or more computational experiments or other information from its base contexts in order to satisfy requests for computational experiments. Any context, either atomic or derived, can support one or more record databases containing the results of computational experiments. Any context may also include a set of bookmarks. A bookmark specifies a computational experiment or set of computational experiments of particular interest.

As indicated, preferably derivation methods create derived contexts. The reasoning system preferably provides a number of pre-defined derivation methods as well as software mechanisms allowing additional derivation methods to be devised as needed. Preferably, each derivation method receives as input one or more other contexts, and optionally other inputs that define how the derived context's inputs and outputs it receives from other contexts are to be transformed. Preferentially, the derivation method creates a derived context that references the appropriate other contexts and will, when executed, perform the defined computations. Advantageously, the derivation methods are preferably generic such that they can operate on any arbitrary other context, or any other context provided that it has some relevant feature or property.

Advantageously, embodiments of the systems and methods described herein provide powerful mechanisms for conducting computational experiments using computer models. Embodiments have a large number of useful applications, such as, for example, performing experiments in software architectures, engineering designs, business strategies, or algorithms, or guiding physical mechanisms for performing experiments. Advantageously, embodiments allow the transformation of arbitrary contexts in order to create derived contexts for performing computational experiments in novel ways and with arbitrary new formats or syntaxes. Additionally, embodiments allow the experiments to be modified in these ways without additional programming.

DETAILED DESCRIPTION OF PREFERRED EMBODIMENTS

Figure 1:
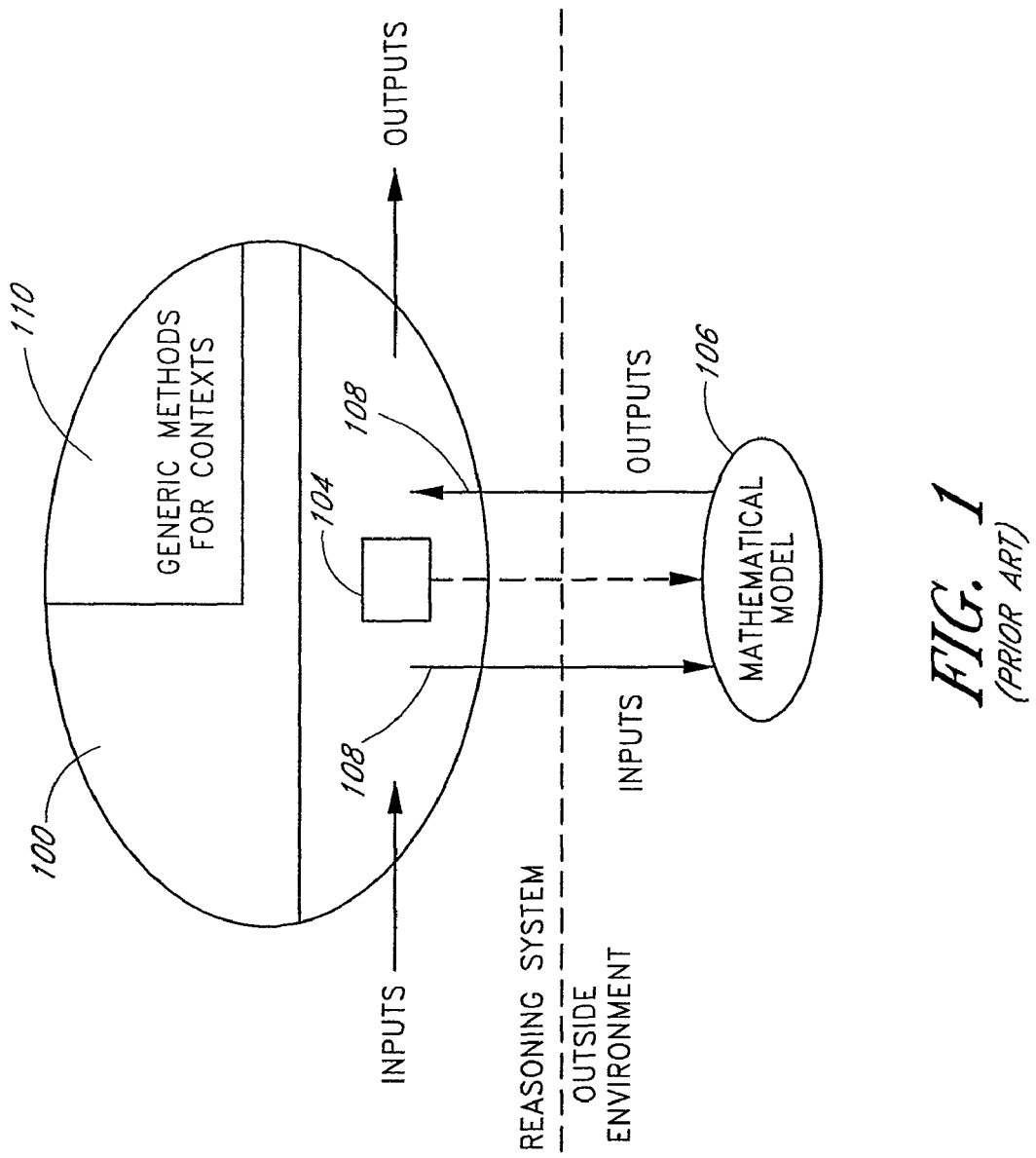
FIG. 1 illustrates an atomic context.

As previously indicated, FIG. 1 illustrates an atomic context. As illustrated, an atomic context 100 encapsulates one or more mechanisms or methods for driving a computational experiment. These mechanisms include any mechanism that accepts inputs and returns outputs that result from those inputs. The mechanisms include both purely software mechanisms and mechanisms that cause physical experiments to be performed. A preferred embodiment of the reasoning system described herein, can interact with all such mechanisms, including purely software mechanisms and mechanisms that cause physical experiments to be performed. Generally, embodiments of the reasoning system described herein treat such mechanisms as one or more mathematical functions that map inputs to outputs. Accordingly, hereinafter, such mechanisms are referred to as "mathematical models." The term mathematical model, as used herein, is a broad term that encompasses the ordinary meaning of mathematical model and additionally encompasses the mechanisms as described above.

An atomic context 100 comprises a reference 104 to such a mathematical model 106, one or more interfaces 108 to the mathematical model, and one or more methods 110 for running operations on the mathematical model. The mathematical model 106, generally but not necessarily located externally to the atomic context, defines a computational experiment and computes answers to the experiment. The mathematical model can be defined using any tool configured to define mathematical models, including, for example, Microsoft Excel, SAS, Matlab, and the like. The atomic context 100 drives experiments using the mathematical model 106, such as by providing input variables to the mathematical model, changing the input values, and iteratively instructing the mathematical model to run the experiment and generate results. An atomic context may provide other services to other software objects as part of a given embodiment. To distinguish its primary function of conducting experiments from other methods that may be supported, henceforth the function of running experiments will be referred as being embodied by a "run method" supported by the atomic context.

As will be apparent to a skilled artisan, an atomic context 100 advantageously can change inputs to a mathematical model 106 and test multiple scenarios. Nevertheless, an atomic context 100 does not change the mathematical model 106 itself or transform the calculations performed by the mathematical model. This means that an atomic context 100 cannot cause a mathematical model 106 to return results that answer a question that has not already been coded in the mathematical model.

Figure 2:
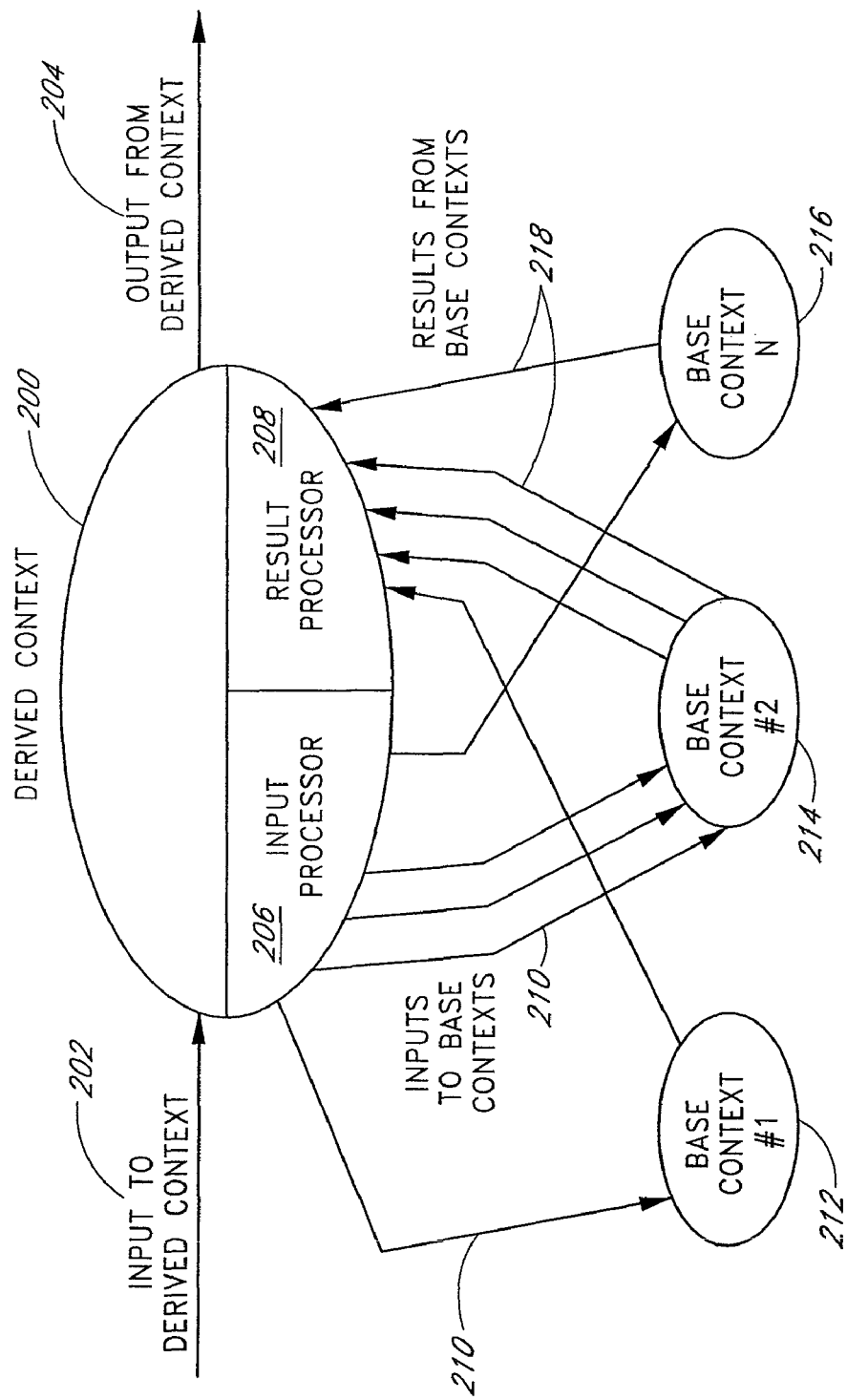
FIG. 2 illustrates a generic derived context.

FIG. 2 illustrates a generic derived context. Preferably, a derived context 200 receives a number of inputs 202 and calculates, based on the inputs 202, a number of outputs 204. Preferably, the derived context 200 performs such calculations by performing one or more calls to one or more other contexts to perform one or more calculations and by performing computations that use the results of the calls to the other contexts. The other contexts called by a the derived context 200 are known as base contexts. In an advantageous embodiment, the derived context 200 comprises an input processor 206 and a result processor 208. Preferably, the input processor 206 is configured to send one or more base inputs 210 to one or more base contexts 212, 214, and 216. Preferably, the result processor 208 is configured to receive one or more base results 218 from the base contexts 212, 214, and 216.

Preferably, the derived context 200 is of the same abstract data type as an atomic context, such that there is no difference between an atomic context and a derived contexts except that the derived context's computations are performed by calling other contexts.

Preferably, the derived context 200 performs its computations using information obtained from the base contexts 212, 214, and 216. The base contexts 212, 214, 216 may be either atomic or derived. The derived context 200 represents the information obtained from the base contexts 212, 214, and 216 in a transformed state. The transformation of information provided by the derived context 200 can advantageously be used to make important patterns more obvious and to allow the reasoning system to discover facts about the information that might otherwise be difficult or impossible to discern. The information inherent in the mathematical models used by atomic contexts can be substantially transformed as the information passes through a series of derived contexts. Accordingly, the information can be put into a form that makes the information much more useful to support a decision or solve a particular problem. Further, because the process of deriving contexts does not involve writing or revising computer programs, embodiments of the invention allow users to rapidly explore alternative derivation chains. Advantageously, a user can seek a derivation chain that makes clear the implications inherent in the atomic contexts being used. Without the assistance of embodiments of the invention, a person may not be able to perform such experimental processes without incurring prohibitive costs and consuming too much time.

Figure 7:
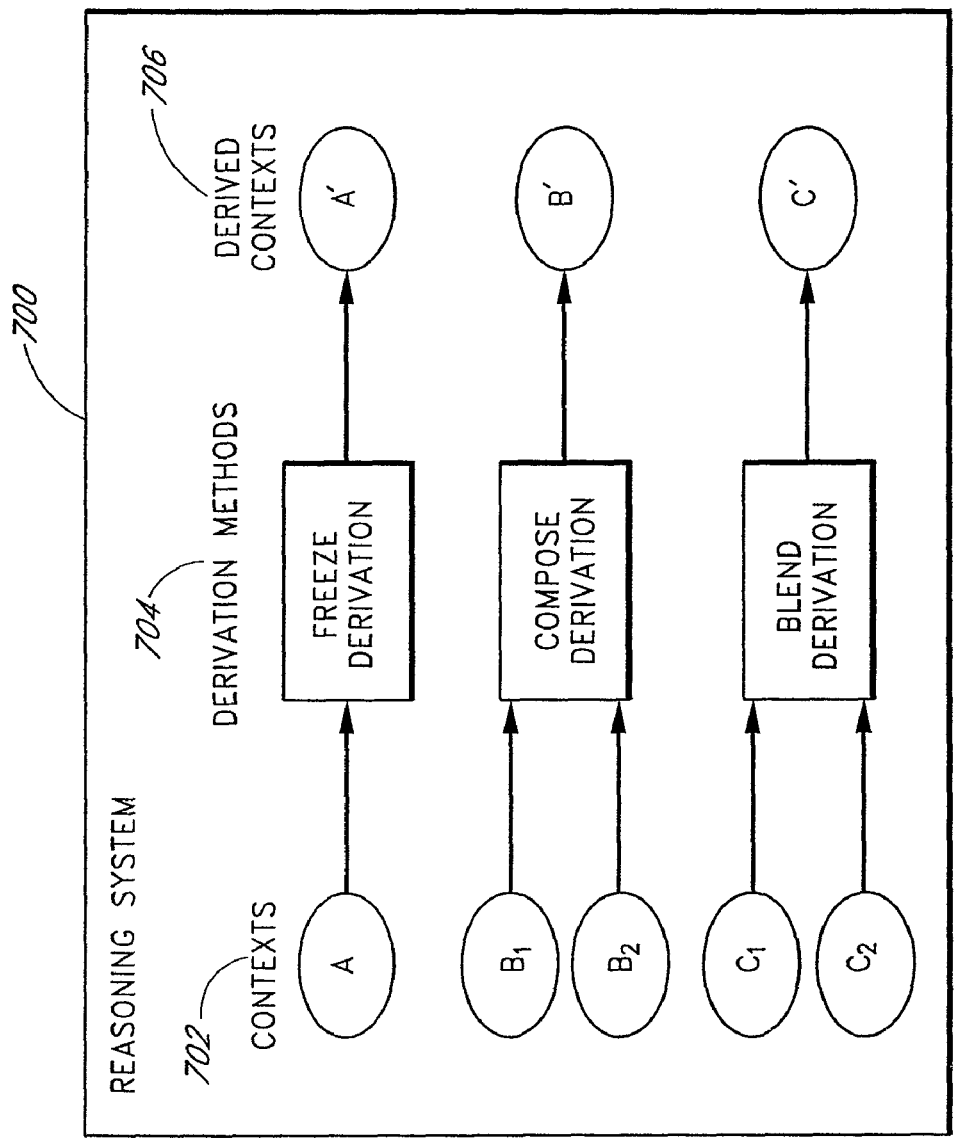
FIG. 7 illustrates one embodiment of a reasoning system.

In one embodiment, the inputs 202 to the derived context 200 are translated to create one or more cases to be run in atomic contexts. Such translation can optionally be accomplished by running a complex series of derivation steps. Advantageously, embodiments of the reasoning system, such as the reasoning system 700 of FIG. 7, provide a library of derivation methods 704. Advantageously, according to one embodiment, the derivation methods 704 include primitive derivations that can be combined to create an infinite range of more complex derived contexts. These derivation mechanisms allow users to explore across alternative reframings of the "language" for describing computational experiments, without making changes to the code. In particular, a single computational experiment in a derived context, may result in multiple experiments being conducted in multiple atomic contexts, with results that summarize the pattern of outcomes in all those cases.

Advantageously, in one embodiment, derivations are recursively applied. The recursive application of derivations allows automated tools to assist in exploration across alternative contexts. Furthermore, users can over time move to progressively higher levels of abstraction in the search for frameworks that provide insights into candidate theories or policies, or answers to whatever problem they are trying to solve. Accordingly, embodiments of the invention enable enhanced modularity between software that encode one or more models that describe what is known about a problem and software that supports analysis using the models. Models can be written that describe the known "physics" of the system, that is, the aspects of phenomenology that are well understood and universally agreed upon. Analytical devices can be provided outside of the model using the reasoning tool, allowing the option of computerized checking of analytic results and tentative conclusions.

Figure 3:
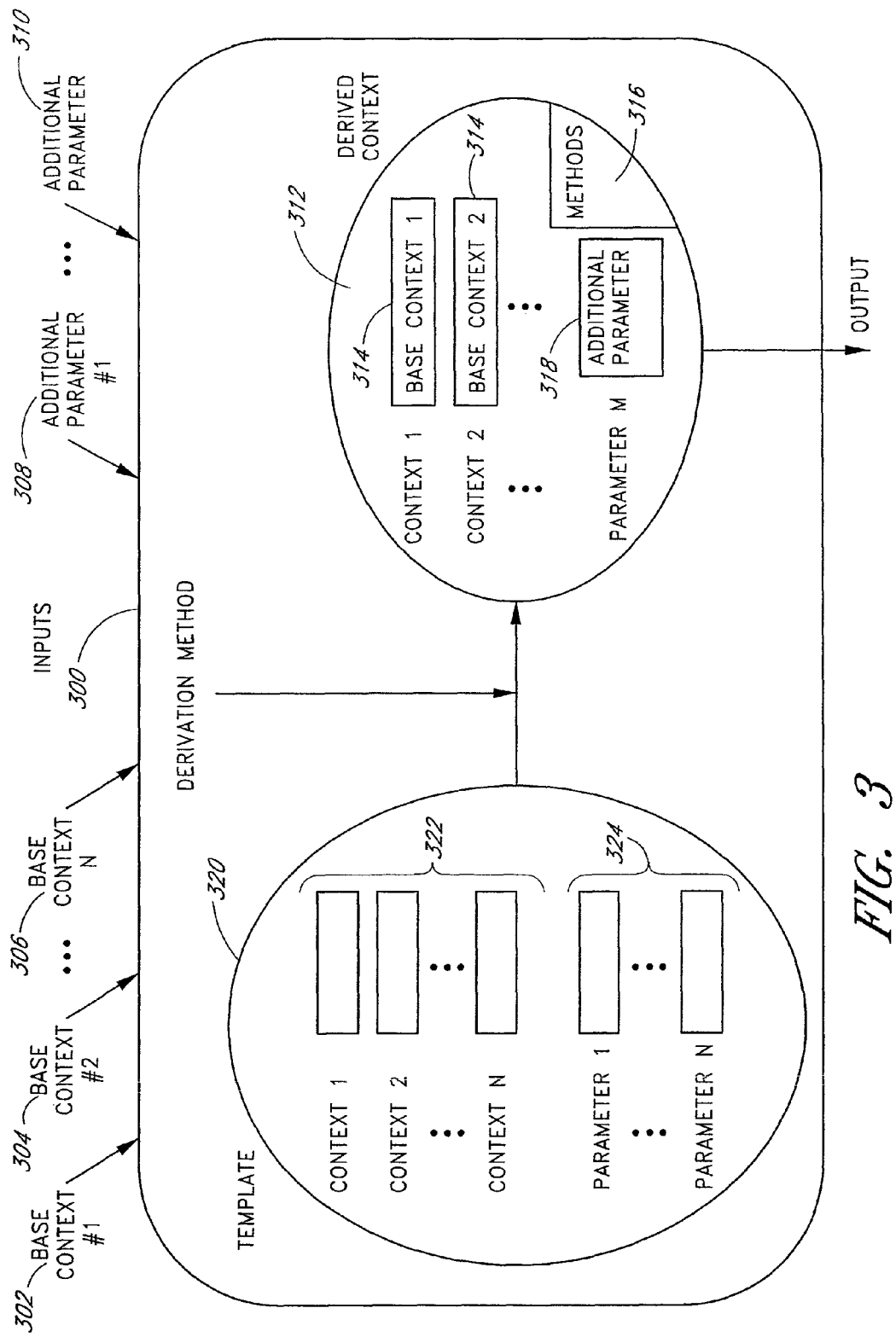
FIG. 3 illustrates the creation of a derived context from one or more base contexts using a derivation method.

FIG. 3 illustrates the creation of a derived context from one or more base contexts using a derivation method. As shown, a derivation method 300 receives one or more base contexts 302, 304, and 306 as input. Optionally, the derivation method 300 also receives additional parameters 308 and 310. Preferably, the additional parameters 308 and 310 at least partially define or modify the transformations to be done. As illustrated, the derivation method 300 comprises a derivation template 320 that defines the creation of a derived context. The derivation template 320 comprises one or more base context placeholders 322 and one or more additional parameter placeholders 324. The derivation method 300 applies the base contexts 302, 304, and 306 and the additional parameters 308 and 310 in accordance with the derivation template 320 in order to create a derived context 312. The derived context 312, as illustrated, encapsulates references 314 to each of the base contexts 302, 304, and 306, methods 316 to carry out the appropriate transformations, and references 318 to the additional parameters 308 and 310.

New derivation methods can be created as needed based on a small number of templates, as will now be described. Three basic types of derived contexts are used in the reasoning system: simple derivations, compound derivations, and resultStore processors.

Figure 4:
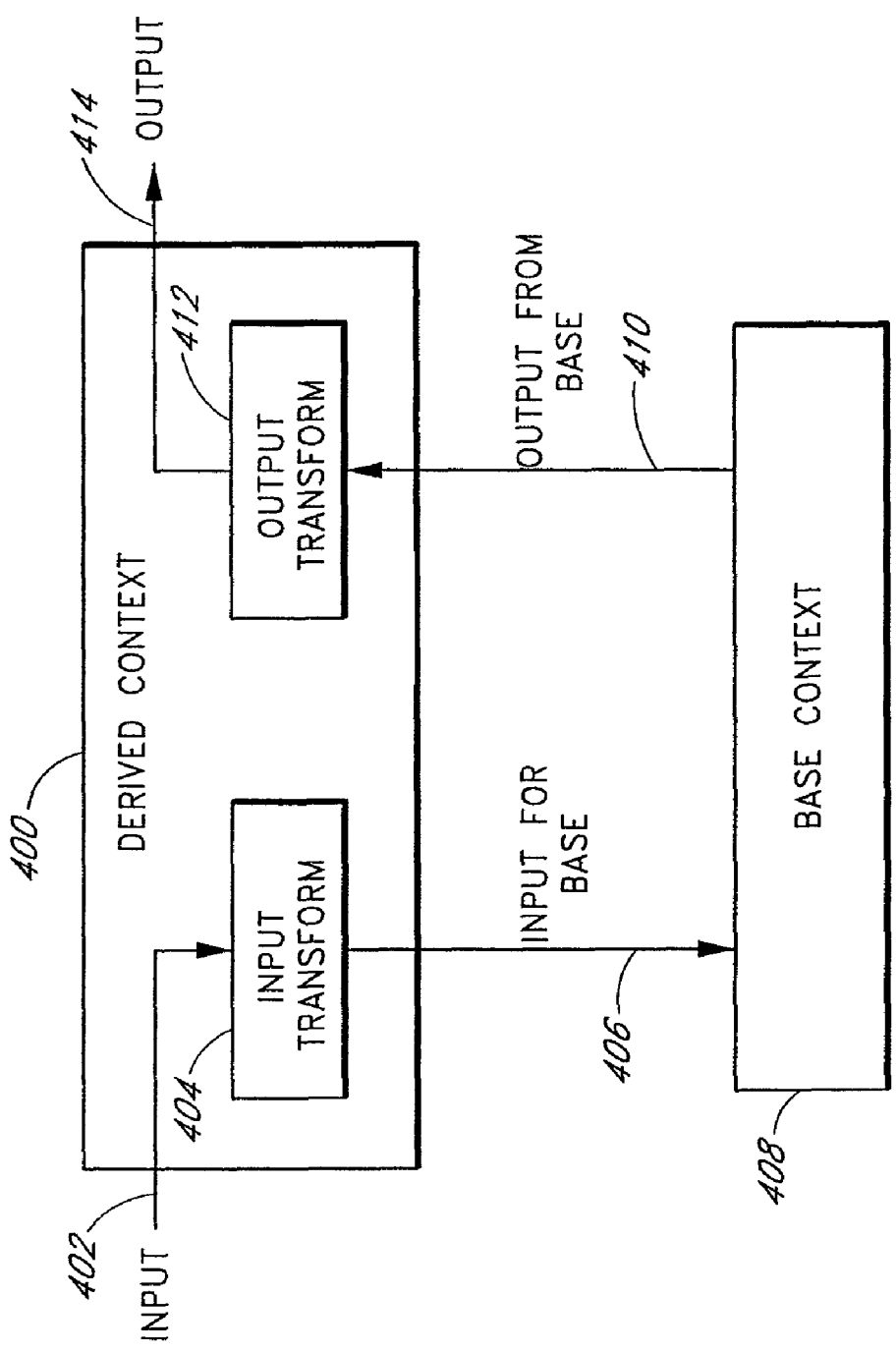
FIG. 4 is a dataflow diagram that illustrates the dataflow for a simple derived context.

FIG. 4 is a dataflow diagram that illustrates the dataflow for a simple derived context. A simple derived context, such as the illustrated derived context 400, causes one experiment to be run for each computational experiment defined by the base contexts referenced by the simple derived context. As illustrated, the derived context 400 receives an input 402. Preferably, the input 402 is entered into an input transform 404. The input transform 404, in one embodiment, is a method that defines a particular transformation on the input 402. Accordingly, the input transform 402 produces a base input 406 that is different than the input 402. The transformed base input 406 is sent to the base context 408 referenced by the derived context 400. The base context 408 performs one or more computations on the base input 406 and returns base output 410. The derived context 400 receives the base output 410 into an output transform 412. The output transform 412, in one embodiment, is a method that transforms the base output 412. The resulting transformed base output becomes the output 414 of the derived context 400. From a point of view outside the derived context 400, the derived context 400 operates in a manner identical to an atomic context; that is, the derived context 400 receives an input, performs computations on the input, and produces an output. However, the derived context 400 is different from an atomic context because the derived context 400 calls one or more base contexts in order to perform at least a portion of the calculations of the derived context 400.

Preferably, simple derived contexts have one parent context and make one call to the run method of each referenced base context for each call to the parent context's run method. The run method for a simple derived context comprises three steps, which in one embodiment are executed sequentially: (1) an input processor takes the input of the derived context and produces a related input for its base context, (2) the base context's run method is called using this input data structure, and (3) the result returned by the base context is submitted to an output processor which produces a related output for the derived context.

A derivation method creates a simple derived context from a base context and possibly additional information required to specify the computation to be performed by the specification-transform and result-transform methods. As is described below, a derivation method can itself be implemented as a context and can be operated on by other derivation methods.

Figure 5:
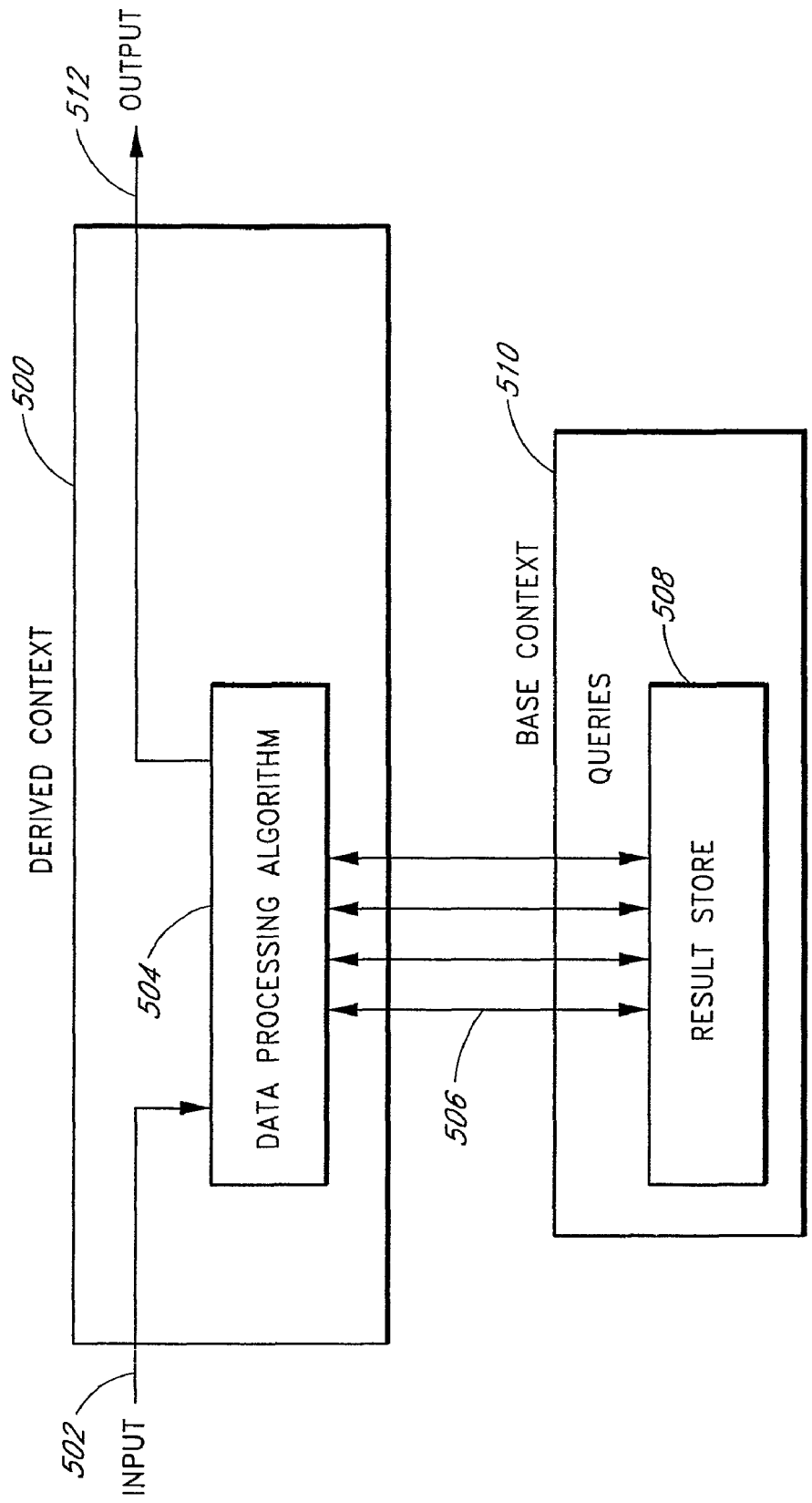
FIG. 5 is a dataflow diagram illustrating the dataflow of a resultsStore processor derived context.

FIG. 5 is a dataflow diagram illustrating the dataflow of a resultsStore processor derived context. A resultsStore processor runs no new computations in any referenced base context, but instead queries a database of stored results from previous computations to generate a result for a given input. As illustrated, in one embodiment, a resultsStore processor derived context 500 feeds input 502 into a data processing algorithm 504. The data processing algorithm 504 initiates a number of queries 506 to a result store 508 of a base context 510. The data processing algorithm 504 receives responses to the queries 506 from the result store 508 and summarizes the responses to produce an output 512. A derivation method for such a derived context takes as inputs a reference one or more base contexts, one or more reference to one or more resultStores for the base contexts, and any other information needed to specify the precise behavior of the data processing algorithm 504. The derivation method returns the newly created derived context.

Figure 6:
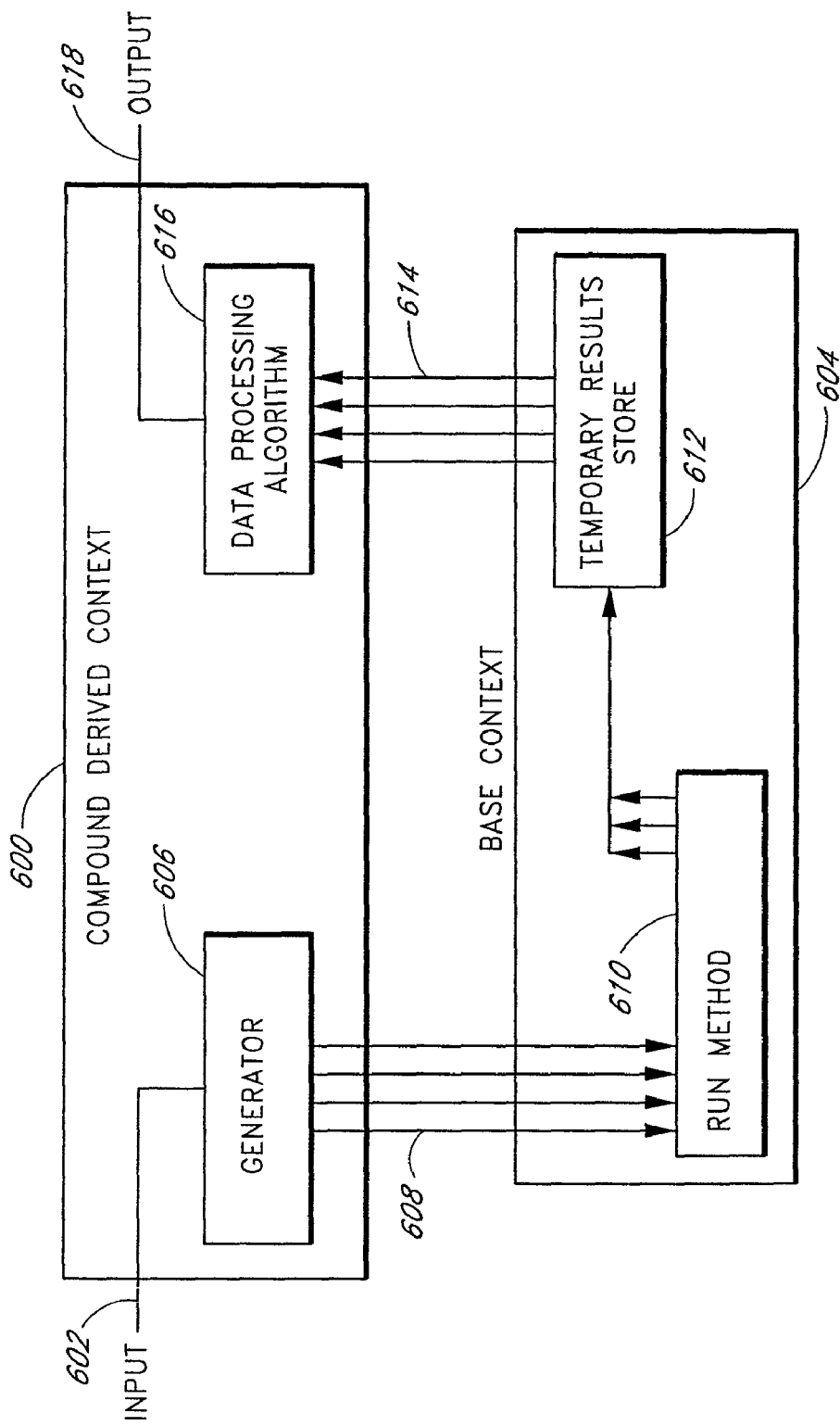
FIG. 6 is a dataflow diagram illustrating the dataflow of a compound derived context.

FIG. 6 is a dataflow diagram illustrating the dataflow of a compound derived context. A compound derived context 600 receives a single input 602 and, based on the single input 602, causes a large number of experiments to be conducted in one or more referenced base contexts 604. Advantageously, therefore, the compound derived context 600 can be used to create compound computational experiments in which single acts by a user cause large numbers of atomic experiments to be conducted in one or more atomic contexts. Preferably, the compound derived context 600 summarizes the results of such multiple experiments.

As illustrated, the input 602 to the compound derived context 600 is received by a generator 606 that is configured to generate a series of base context inputs 608. A run method 610 of the base context 604 receives the base context inputs 608, processes, the base context inputs 608, and causes results to be stored in a temporary resultsStore 612. In one embodiment, the temporary resultsStore 612 comprises a database of results. Preferably, a series of data 614 is entered into a data processing algorithm 616 of the compound derived context 600. The data processing algorithm 616 processes the data 614 and produces a summary of the data 614. The summary of the data 614 becomes the output 618 of the compound derived context 600.

A derivation method that returns a compound derived context takes as inputs one or more references to one or more base contexts and any additional information that is needed to specify the action of the generator 606 and data processing algorithm 616 that is to be used. The generator 606 may be wholly encapsulated within the compound derived context 600 or a reference to a generator may be used.

FIG. 7 illustrates one embodiment of a reasoning system. As illustrated, a reasoning system 700 comprises a plurality of contexts 702, a plurality of derivation methods 704, and a plurality of derived contexts 706. Preferably, the derivation methods 704 are pre-defined and provided with the reasoning system 700. Advantageously, a user can mix and match, nest, and compose these derivation methods 704 to create derived contexts that ask for complex and precise results that can be derived from an existing mathematical model. Advantageously, additional information can be extracted from an existing mathematical model without reprogramming the model.

A skilled artisan will appreciate, in light of this disclosure, that FIG. 7 is illustrative only and non-exhaustive. Many more derivation methods exist besides the Freeze, Compose, and Blend derivations that are illustrated. Additionally, the particular derivation methods 704 illustrated are not required components of every embodiment of the reasoning system.

Some of the derivations that are provided by embodiments of the reasoning system 700 are now illustrated and described with respect to FIGS. 8-31. For each described derivation, a derived context that transforms data in accordance with the derivation is illustrated. Furthermore, for each derivation, a derivation method that creates the derived context is illustrated.

Freeze Derivation

Figure 8:
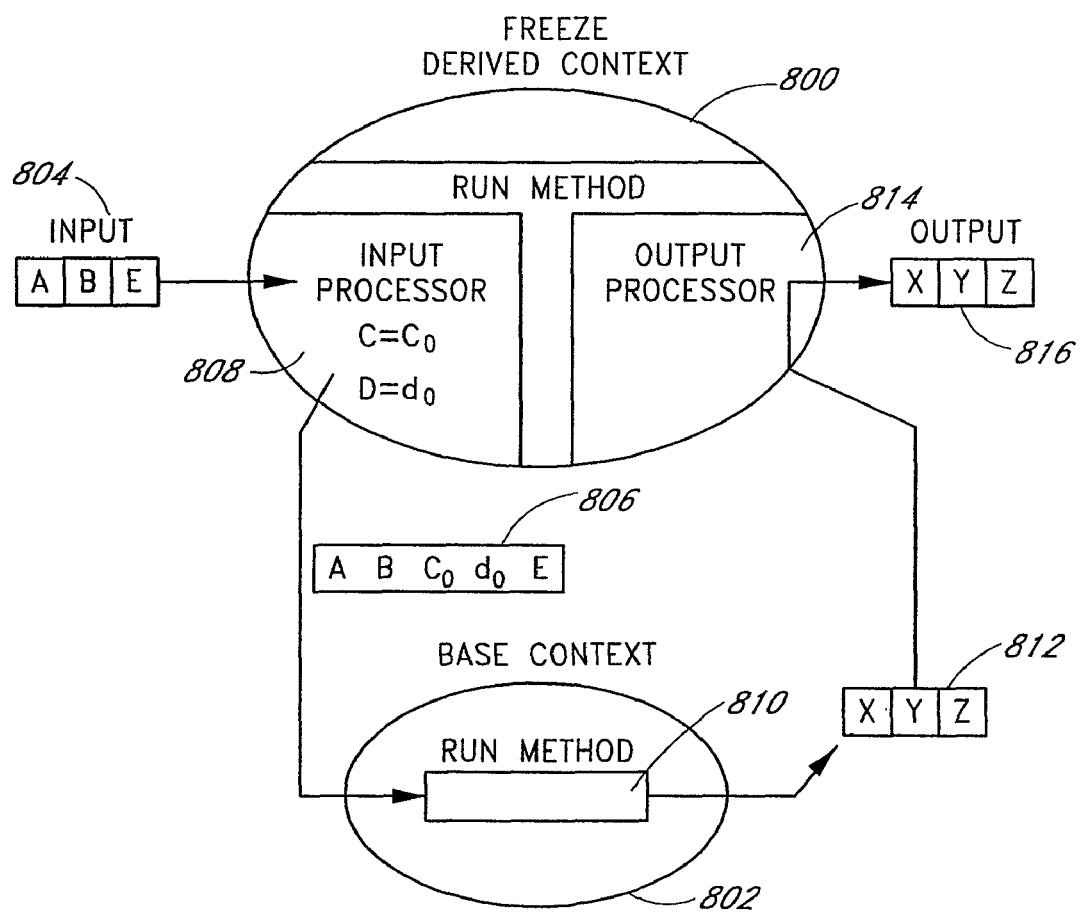
FIG. 8 illustrates an embodiment of a freeze derived context.

FIG. 8 illustrates an embodiment of a freeze derived context. As illustrated, a freeze derived context 800 has fewer inputs or outputs than does a referenced base context 802. The freeze derived context 800 sets some of the inputs or outputs of a base context to a constant value and receives or calculates variable inputs or outputs for the remaining subset of the inputs or outputs. For example, FIG. 8 illustrates an example in which the base context 802 performs a calculation on five inputs 806 A, B, C, D, and E. However, the freeze derived context 800 receives only three inputs 804 A, B, and E. In addition, the input processor 808 of the freeze derived context 800 is configured to supply constant values for inputs C and D. By thus providing constant values, the freeze derived context 800 transforms its three input data structure 804 into a five input data structure 806 that has the correct number of inputs to be received by the base context 802. The freeze derived context 800 is preferably configured to call the run method 810 of the base context 802. The base context 802 calculates outputs 812. The output processor 814 of the freeze derived context 814 receives the outputs 812 of the base context 802 and, in the example illustrated, simply passes the outputs 812 as the outputs 816 of the freeze derived context 800 without transformation.

Figure 9:
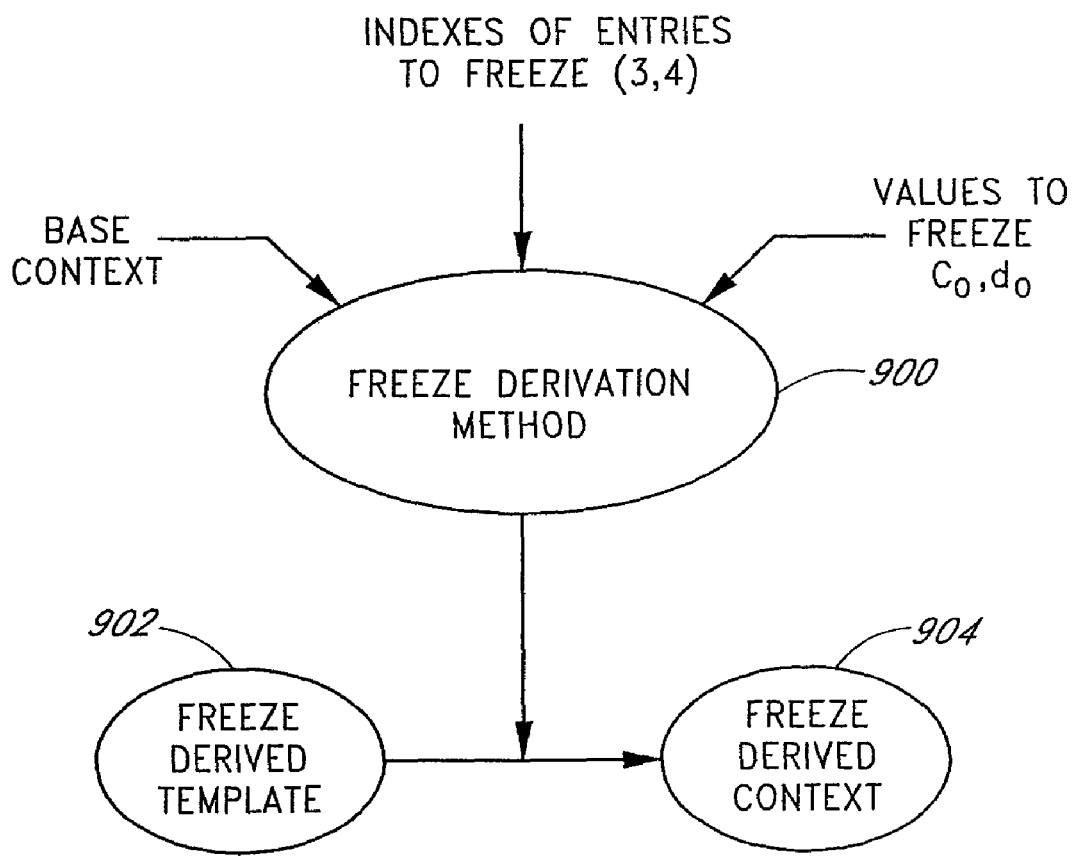
FIG. 9 illustrates an embodiment of the derivation method that creates a freeze derived context.

FIG. 9 illustrates an embodiment of the derivation method that creates a freeze derived context. As illustrated, a freeze derivation method 900 receives as inputs a base context, indices indicative of the entries to freeze, and values at which to freeze those entries. In one embodiment, the freeze derivation method 900 can also receive additional parameters that specify other properties of the derived context, such as, for example, whether the derived context will keep a database of cases that the derived context has computed. As illustrated, the freeze derivation method 900 employs a freeze derived template 902 in order to create a freeze derived context 904. In one embodiment, this template 902 is modified by setting explicit values for the indices of the entries that are to be fixed and the values they are to receive (in the case of freezing inputs this modifies the input processor), and by setting the reference to the context to use as the base for this derived context.

In one embodiment, the reasoning system 700 includes a more elaborate freeze mechanism, where instead of setting the removed entry to a constant value, the reasoning system 700 sets the removed entry based on the results of evaluating an expression that depend at least in part on the values of the remaining input entries. For example, the reasoning system 700 can be configured to set the value of input C to be 2A+B, or two times the value of input A plus the value of input B. In a preferred embodiment, the expression comprises a Java expression. A skilled artisan will appreciate that if an expression is set to be a constant, the more elaborate freeze mechanism produces results identical to the simpler freeze mechanism described above with reference to FIGS. 8-9.

While the freeze derivation has been described with reference to freezing inputs, in one embodiment, the freeze derivation is configured such that the freeze derivation can additionally or alternatively freeze outputs. A derivation method that eliminates some of the outputs of a base context works identically to the foregoing examples described in relation to freezing inputs, except that the frozen output variables are not copied from the result data structure for the base context when creating the result data structure for the derived context.

Weighted Sum Derivation

Figure 10:
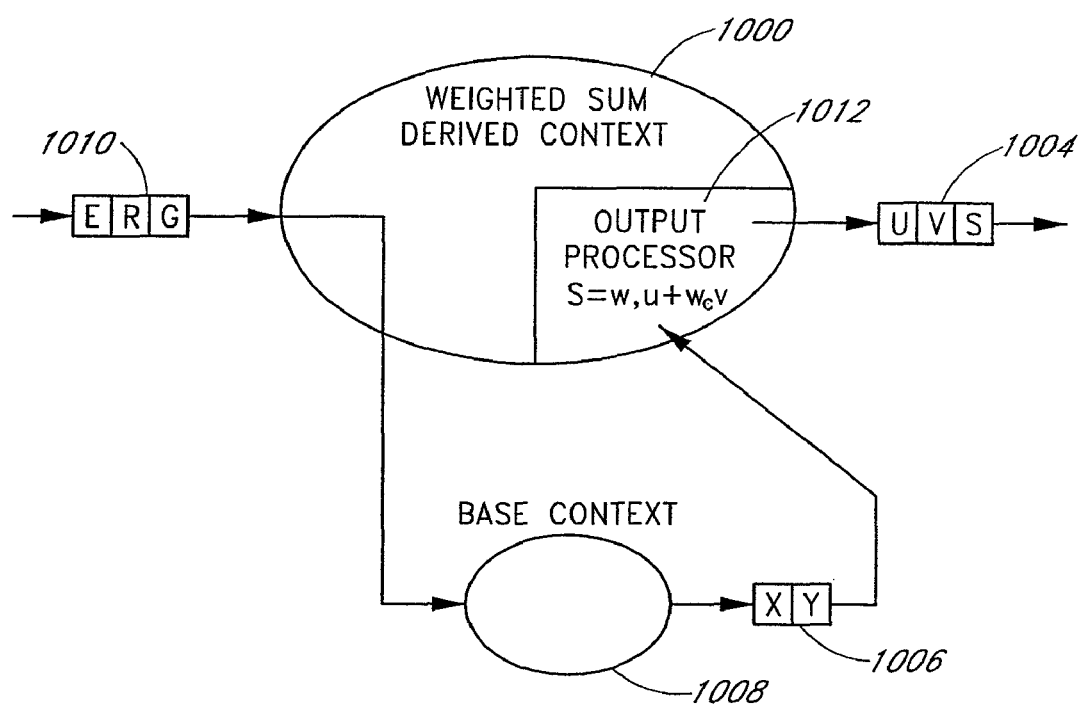
FIG. 10 illustrates an embodiment of a weighted sum derived context.

FIG. 10 illustrates an embodiment of a weighted sum derived context. A weighted sum derived context 1000 creates at least one output 1002 that is a weighted sum of at least a subset of the outputs 1006 of a base context 1008, or equivalently, a weighted sum of all the outputs 1006 in the base context 1008, where some of the weights may be zero. These weights get their values when the derived context 1000 is created.

In one embodiment, the internal structure of the weighted sum derived context 1000 is similar to that of the freeze derived context 800. The input processor of the weighted sum derived context 1000 passes input 1010 to the run method of the base context 1008 unchanged. The output processor 1012 of the weighted sum derived context 1000 transforms the outputs 1006 returned by the base context 1008 by adding at least one additional field whose value is computed by taking a weighted sum of the other outputs 1006. The values for the weights are stored in the derived context 1000 and their values are set by the weighted sum derivation method when the derived context is constructed.

Figure 11:
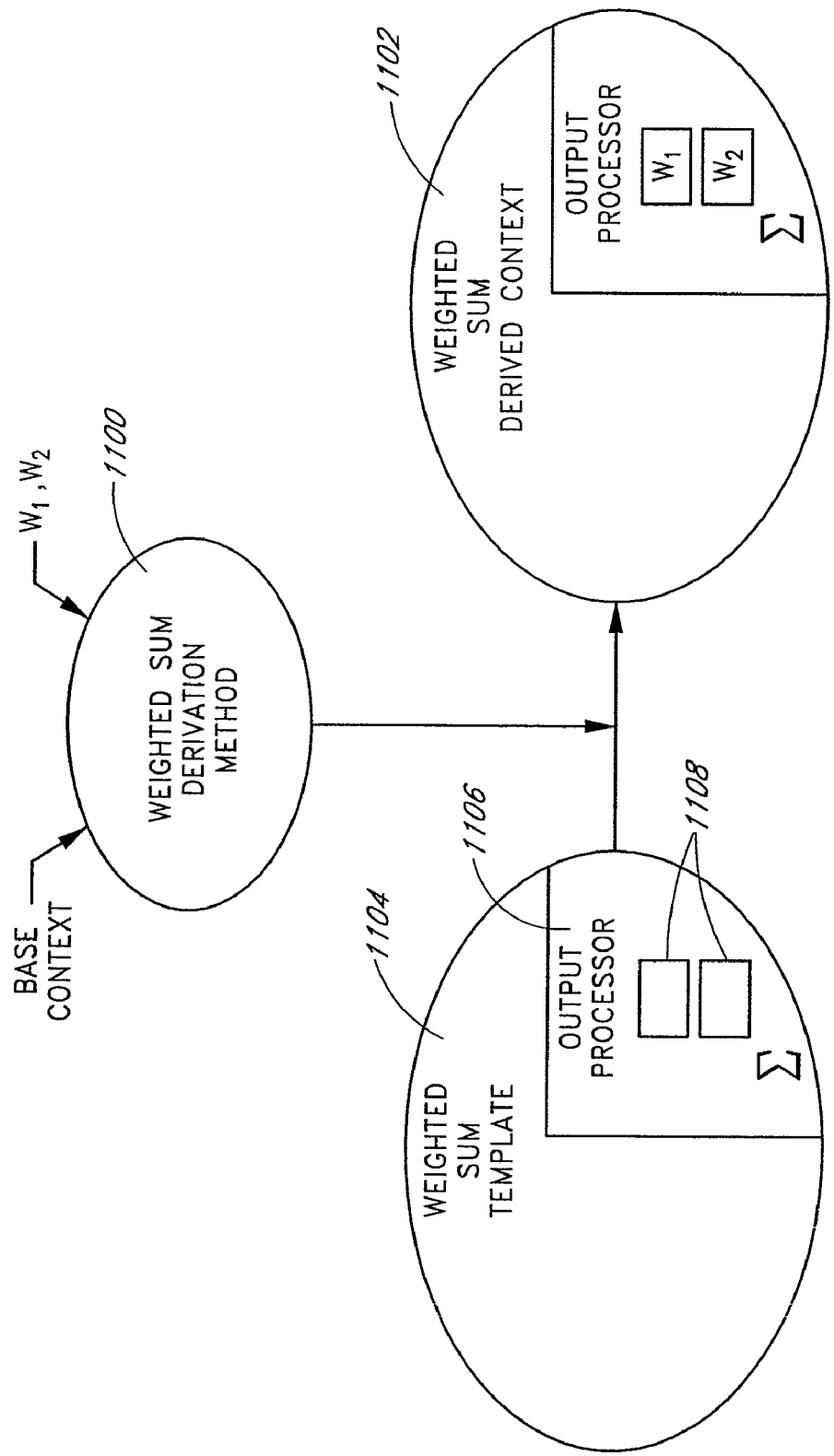
FIG. 11 illustrates the creation of a weighted sum derived context by a weighted sum derivation method.

FIG. 11 illustrates the creation of a weighted sum derived context by a weighted sum derivation method. A weighted sum derivation method 1100 takes as inputs a reference to a base context, a list of weights equal in number to the number of output entries in the base context (one or more of which may be 0), and depending upon the implementation, other inputs that specify other properties of the derived context 1102. The weighted sum derivation method 1000 then creates the derived context 1102 from a weighted sum template 1104. An input processor of the weighted sum template 1104 copies input to create an input for the base context, then calls the base context with the input. An output processor 1106 stores one or more weights 1108. In one embodiment, the weights 1108 are given specific values by the weighted sum derivation method when the derived context 1102 is created.

A preferred embodiment also supports a more complex version of the weighted sum derivation known as the formula derivation. The formula derivation works like the weighted sum derivation, except instead of computing a weighted sum, it computes the value of a Java expression that takes outputs of the base context as parameters. Preferably, any legal Java expression can be used. Alternatively, in some embodiments, a subset of legal Java expressions can be used. The particular Java expression to be used is stored in the derived context's output processor at the time it is created by the derivation method, instead of the weights used in the example above. The Java expression is evaluated every time the derived context receives an output from its base.

Disaggregate Derivation

Figure 12:
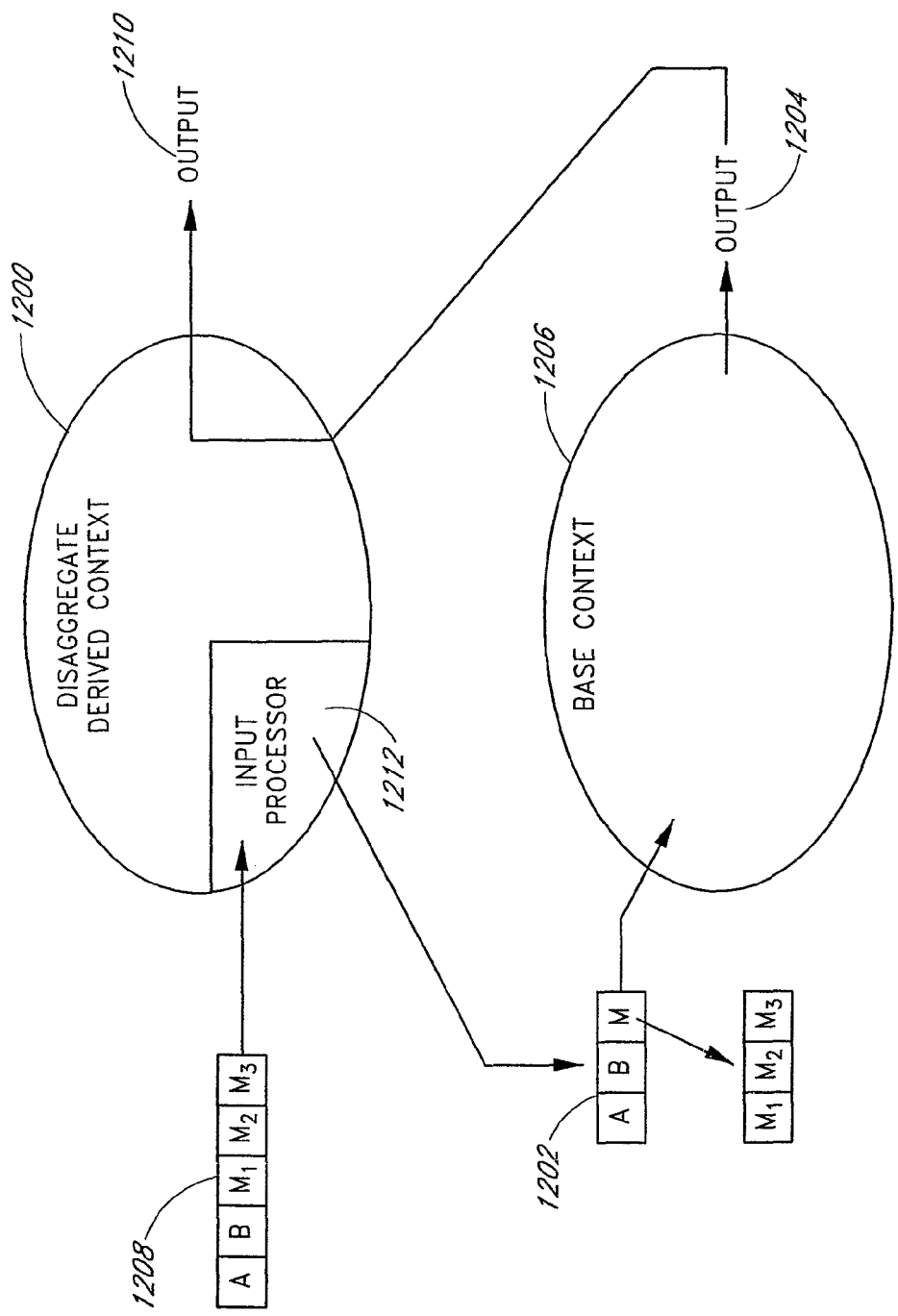
FIGS. 12-14 illustrate an embodiment of a disaggregate derived context and a derivation method for creating such a derived context.
Figure 13:
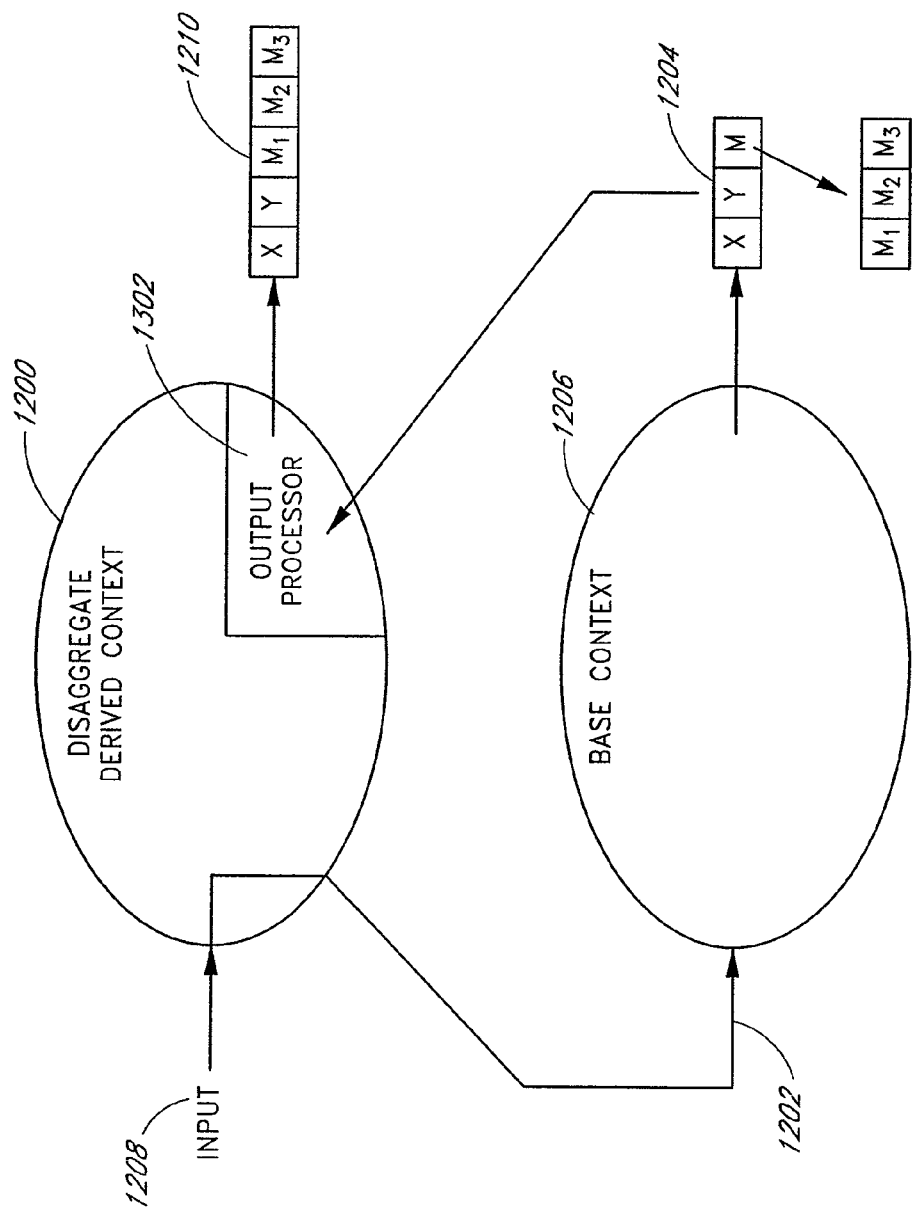
Figure 14:
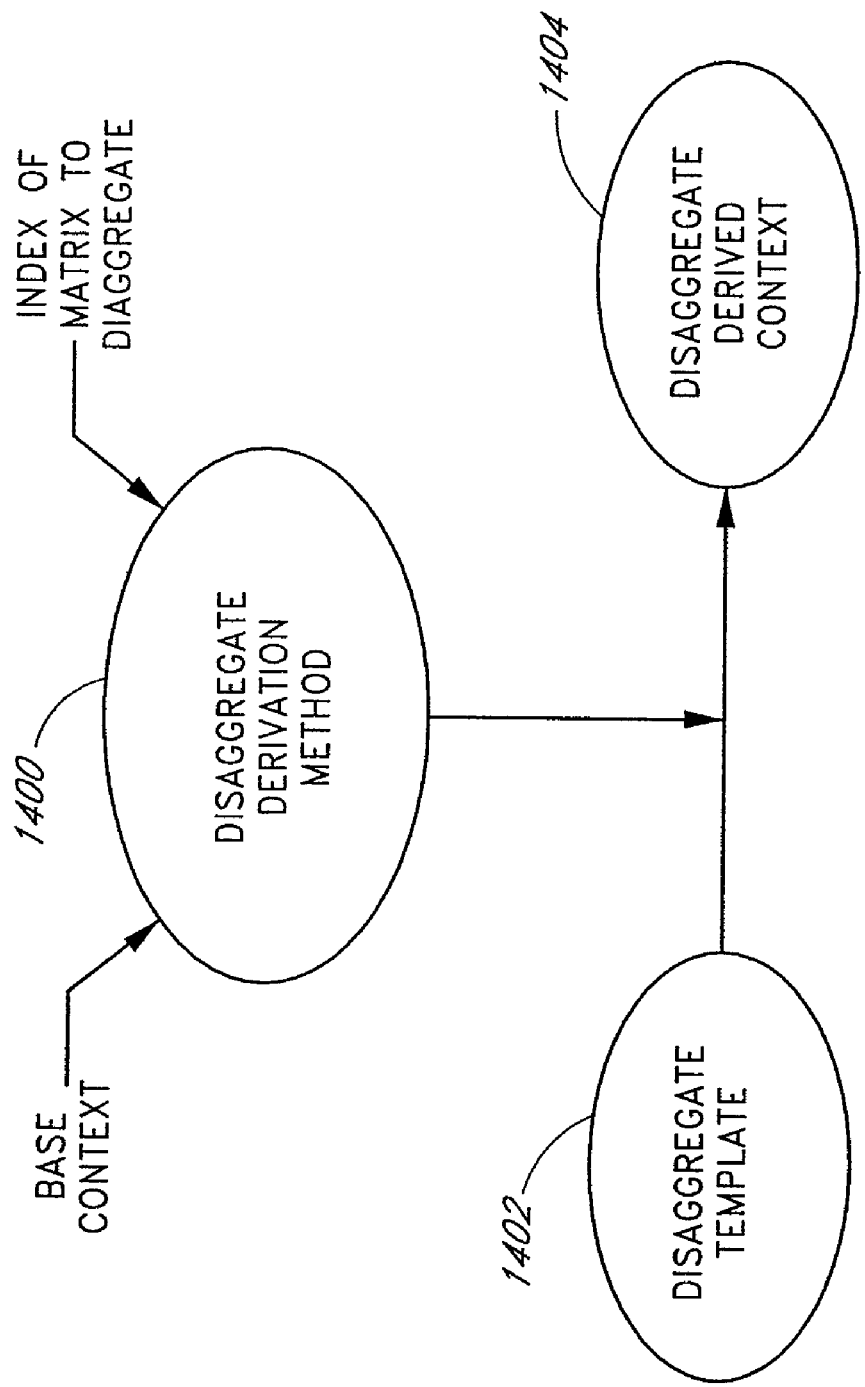

FIGS. 12-14 illustrate an embodiment of a disaggregate derived context and a derivation method for creating such a derived context. A disaggregate derived context 1200 replaces an array in either inputs 1202 or outputs 1204 of a base context 1206 with a list of scalar entries. For example, if in the base context 1206 there is an input variable that is a double array of length 4, then in the derived context 1200 this entry will be replaced by four new double variables.

An example of the operation of the disaggregate derived context 1200 is illustrated in FIGS. 12-13. In FIG. 12, the base context 1206 has inputs 1202 A, B, and M, where M is a matrix or more complex data structure with three elements M1, M2, and M3. The derived context 1200 has inputs 1208 A, B, M1, M2, and M3. The outputs 1204 and 1210 of these two contexts 1206 and 1200 are identical, and the output processor 1302 of the derived context 1200 simply copies the output data structure 1204 of the base context 1206 to create the output 1210 of the derived context 1200.

Similarly, in FIG. 13 the base context 1206 has outputs 1204 X, Y, and M, where M is a matrix or more complex data structure with elements M1, M2, and M3. The associated derived context 1200 has outputs 1210 X, Y, M1, M2, and M3. The inputs 1202 and 1208 for these two contexts 1200 and 1206 are identical, and the input processor 1212 of the derived context 1200 makes no changes. The input processor 1212 simply copies the inputs to the derived context to create the inputs to the base context 1206.

FIG. 14 diagrams how the disaggregate derivation method operates to create a disaggregate derived context. A disaggregate derivation method 1400 takes as inputs a reference to a base context and an index of an entry to disaggregate. The derivation method 1400 then modifies a disaggregate template 1402, setting variables in accordance with the foregoing input parameters, and creates a disaggregate derived context 1404.

Aggregate Derivation

Figure 15:
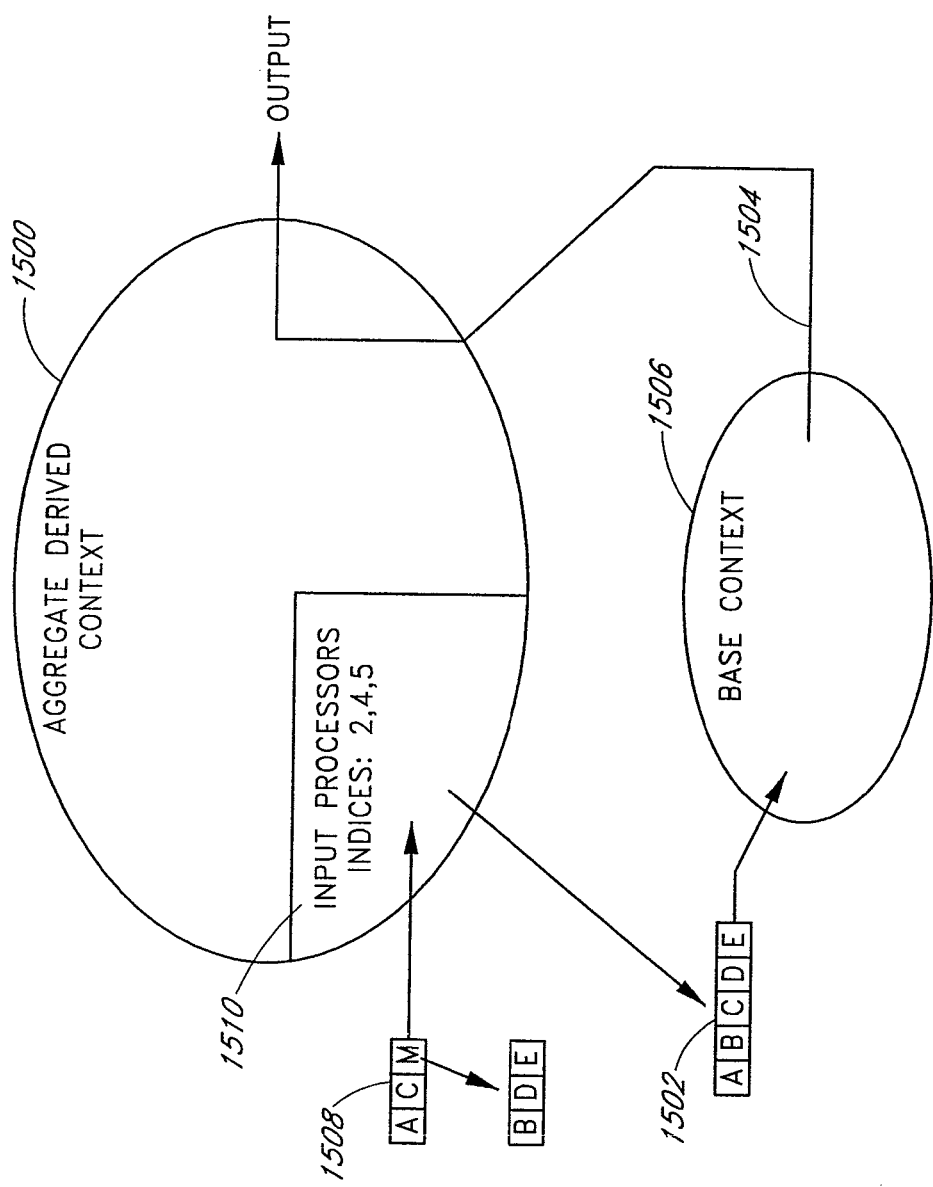
FIGS. 15-17 illustrate an embodiment of an aggregate derived context and derivation method.
Figure 16:
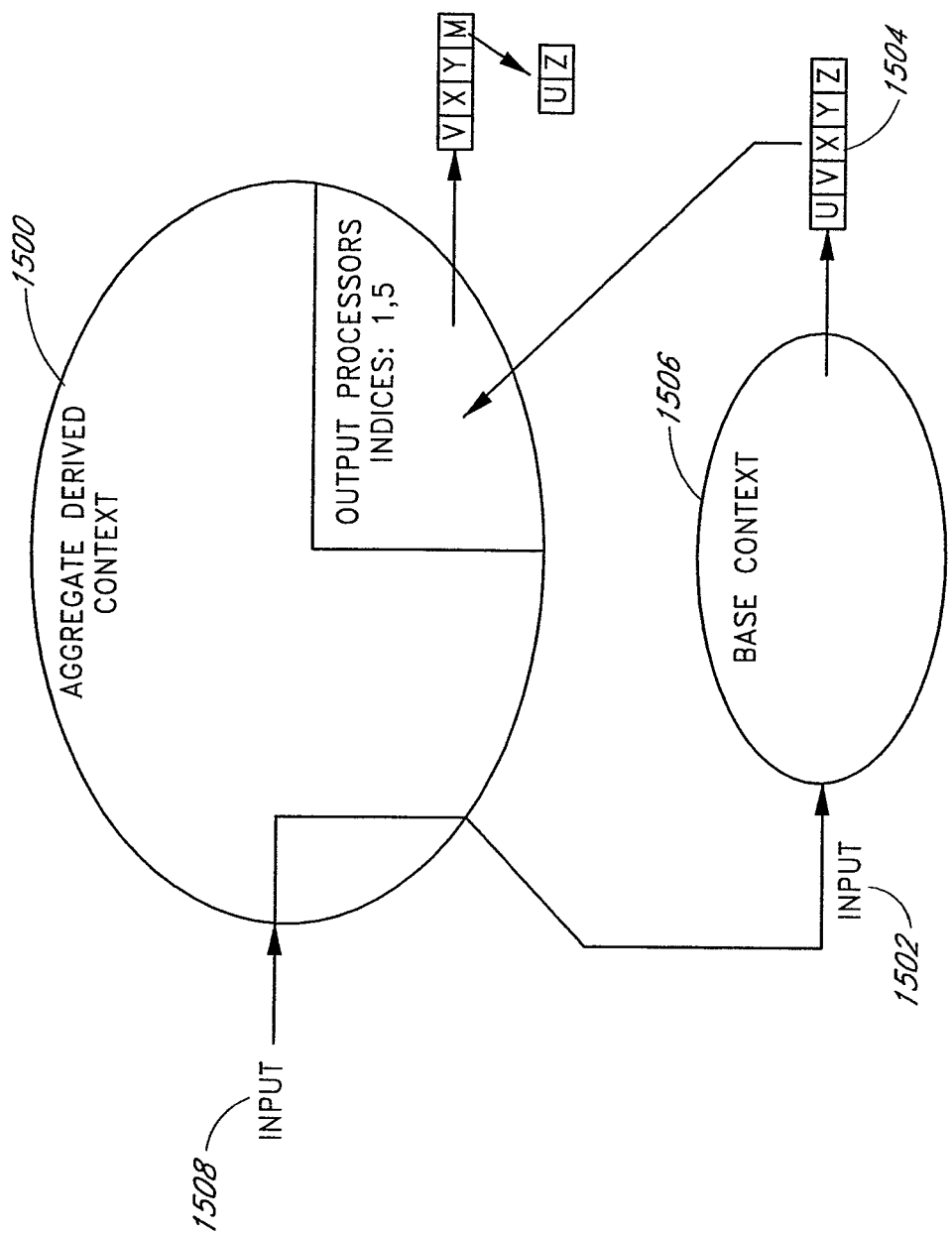
Figure 17:
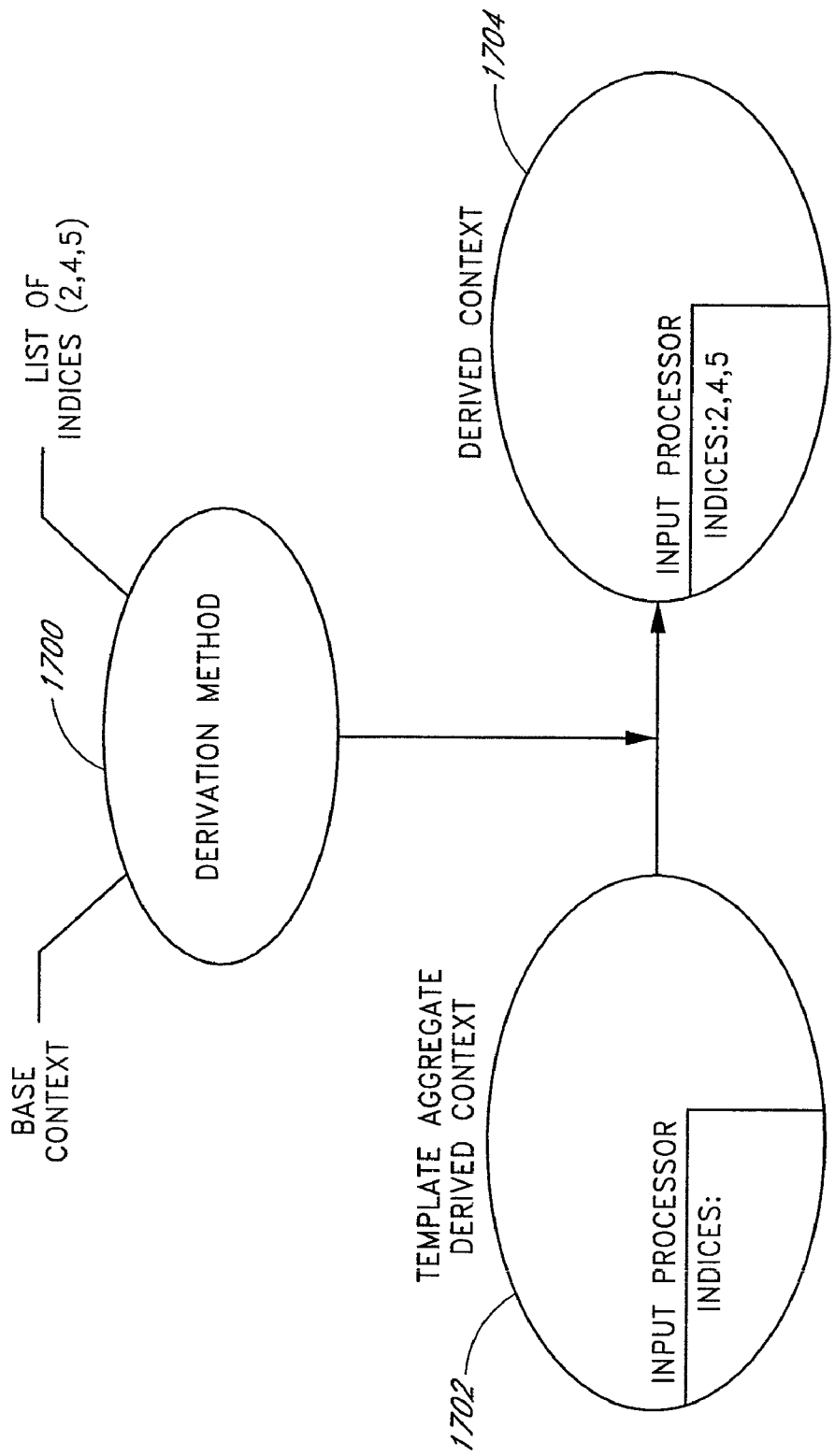

FIGS. 15-17 illustrate an embodiment of an aggregate derived context and derivation method. An aggregate derived context 1500 is a simple derived context that replaces a series of inputs 1502 or outputs 1504 of a base context 1506 with a single entry in the corresponding data structure for the derived context 1500. The new entry in the derived context 1500 comprises an array with the entries that are being replaced. This entry is properly called a data structure if the values being aggregated are of differing types. For example, if in the base context 1506 there are four inputs 1502 of type double to be aggregated, then in the derived context 1500 these inputs 1502 will be replaced with a new double array of length four. The aggregate derived context 1500 therefore performs an inverse operation to that performed by the disaggregate derived context 1200. Note, however that in a preferred embodiment there is a convention of adding new entries at the end of the input or output data structure. Thus, to produce an exact mathematical inverse, the aggregate derived context would need to be followed by a permute derived context as described below.

FIG. 15 exemplifies the operation of an aggregate derived context. A base context 1506 in this example has inputs 1502 A, B, C, D, and E and the derived context 1500 has an input data structure 1508 comprising A, C, and M, where M has three elements B, D, and E. The derived context 1500 operates by taking its input data structure 1508 and creating a data structure that can be read by the base context 1506. M is not copied, but its elements are used to set values to the appropriate entries in the input 1502 to the base context 1506. A list 1510 of positions or indices for the elements of M are stored in the derived context 1500, and are given values by the derivation method when the context is created. FIG. 16 illustrates a similar example in which the aggregated values occur in the output data structure rather than the input data structure.

FIG. 17 illustrates the creation of an aggregate derived context by an aggregate derivation method. As with other derivation methods, the aggregate derivation method 1700 operates by modifying an aggregate template 1702, setting variables in that template 1702 to values it receives as parameters when the derivation method 1700 is invoked, and creating the derived context 1704 based on the template 1702.

Permute Derivation

Figure 18:
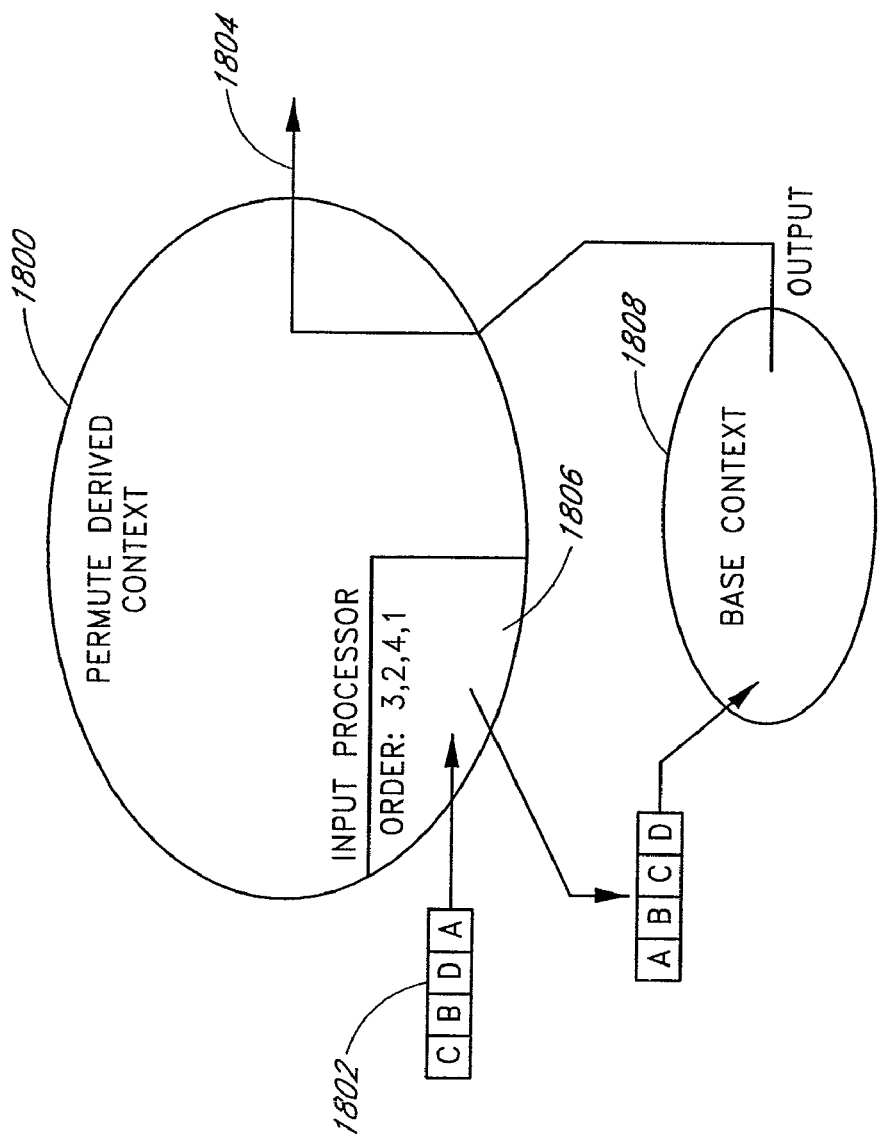
FIGS. 18-19 illustrate an embodiment of a permute derived context and derivation method.
Figure 19:
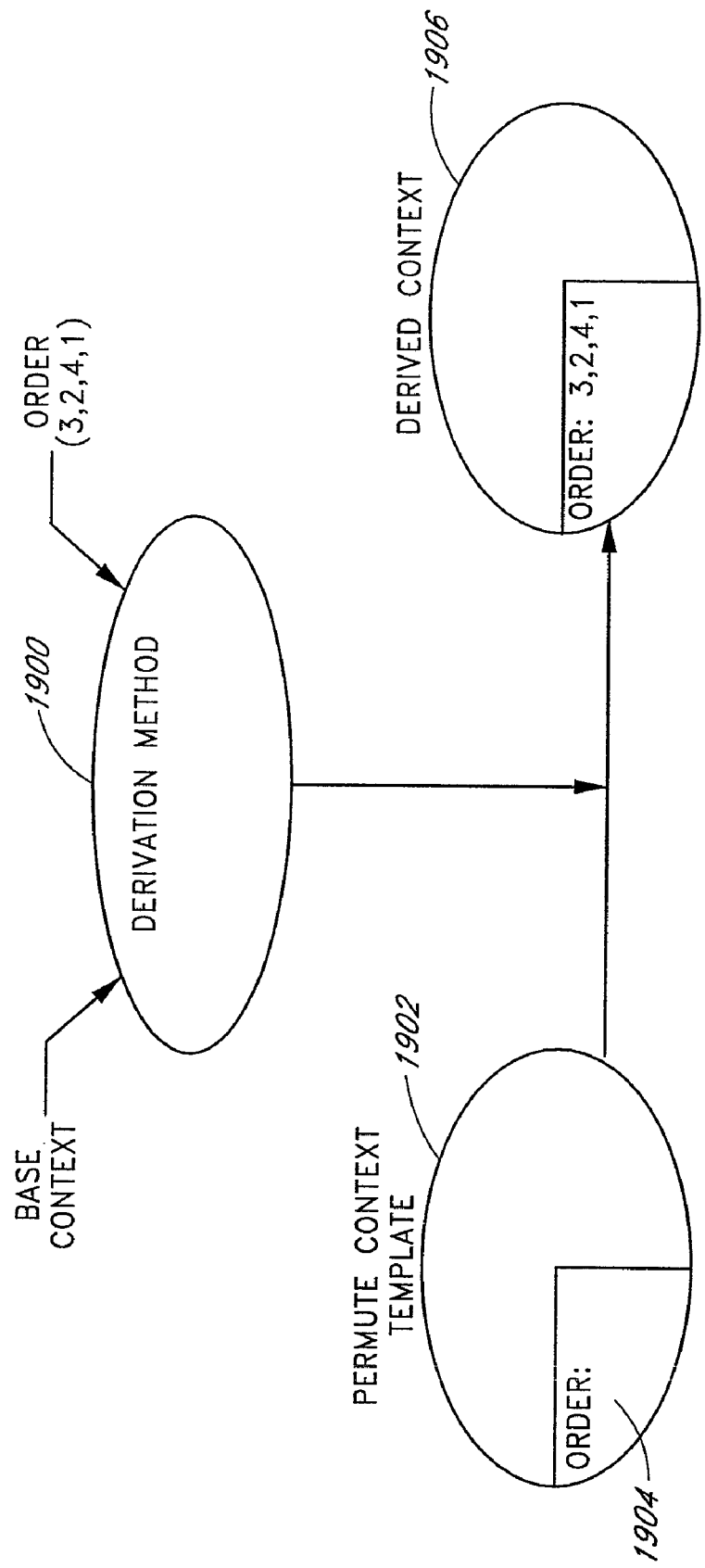

FIGS. 18-19 illustrate an embodiment of a permute derived context and derivation method. A permute derived context 1800 is a simple derived context that changes the order of entries in an input data structure 1802 or an output data structure 1804. A permute derived context has input or output transform methods 1806 that use a list to describe a new order that the entries are to be placed in. The template 1902 used by the permute derivation method 1900 preferably performs a permuted copy operation. By setting the permuted order list 1904 in the template 1902, along with the reference to the base context 1808, the template 1902 can be converted to the desired derived context 1906.

Nearest Neighbor Derivation

Figure 20:
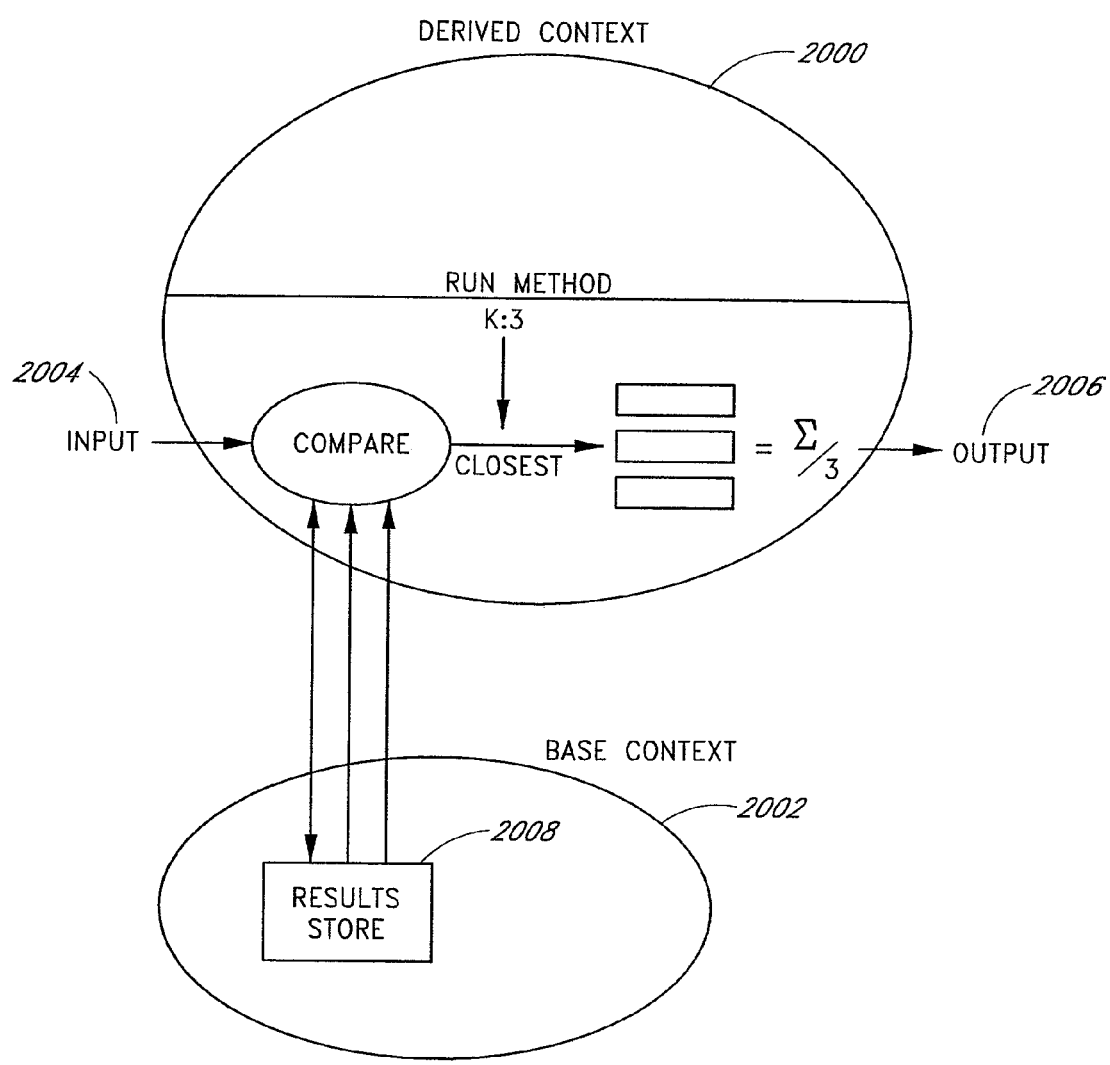
FIGS. 20-21 illustrate an embodiment of a nearest neighbor derived context and derivation method.
Figure 21:
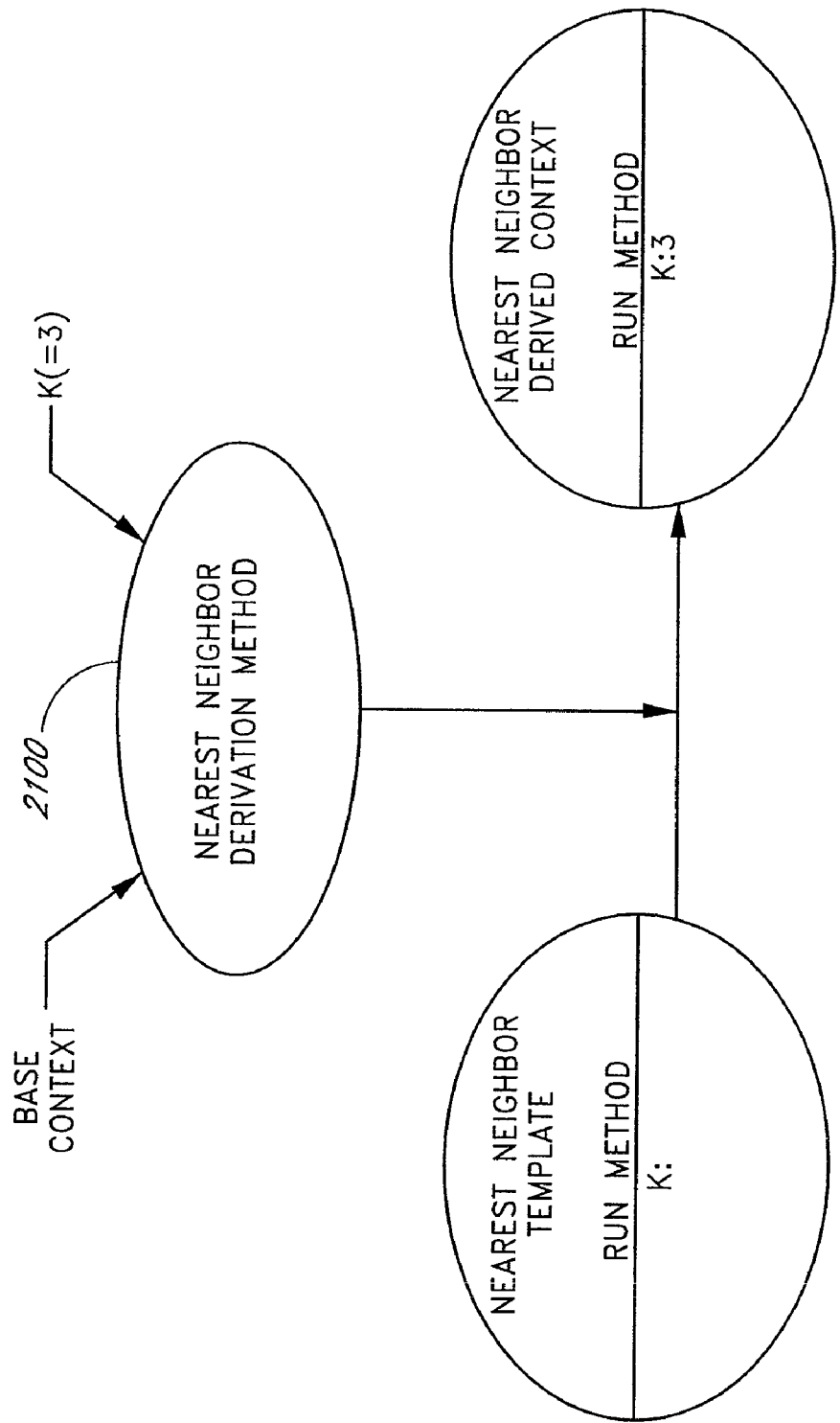

FIGS. 20-21 illustrate an embodiment of a nearest neighbor derived context and derivation method. A nearest neighbor derived context 2000 is an example of a results store processor (FIG. 5) and performs a derivation that is an example of a broad class of derivations that smooth the results that have already been obtained by a base context 2002. The nearest neighbor derivation is often used to create a fast running approximation to a slow or otherwise expensive model or other platform for making experiments. The nearest neighbor derived context 2000 and the base context 2002 upon which the derived context 2000 relies have identical input 2004 and output 2006 data structures. However, the nearest neighbor derived context 2000 calculates the value of outputs 2006 in a manner that is different from manner employed by the base context 2002.

The nearest neighbor derived context 2000 queries a results store 2008 of the base context 2002 to determine the k records in the results store 2008 whose inputs are closest (under some measure) to the input that the nearest neighbor derived context 2000 is computing a result for. The nearest neighbor derived context 2000 then calculates the outputs 2006 by taking a weighted average of the outputs of those k cases from the base context 2002. The number of records used in taking this average (k) is a constant set by the derivation method 2100 when the derived context 2000 is created.

Statistics Derivation

Figure 22:
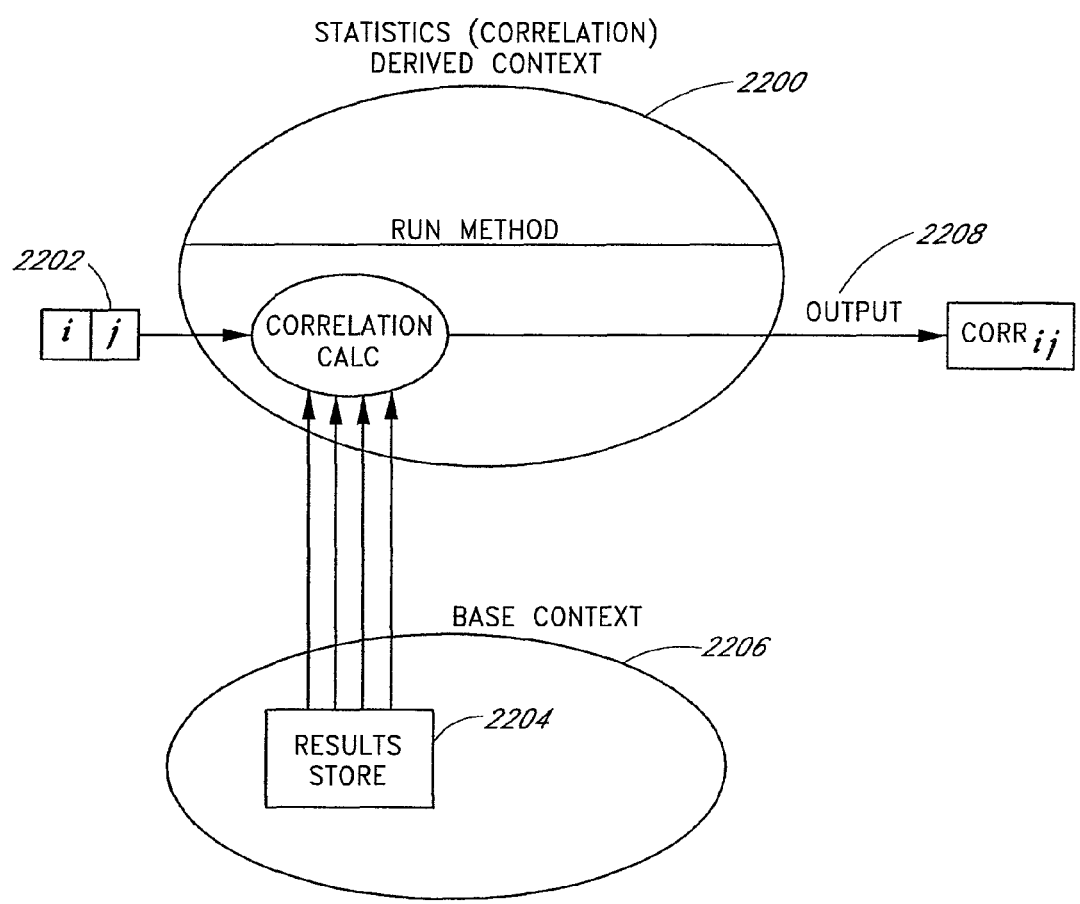
FIGS. 22-23 illustrate an embodiment of a statistics derived context and derivation method.
Figure 23:
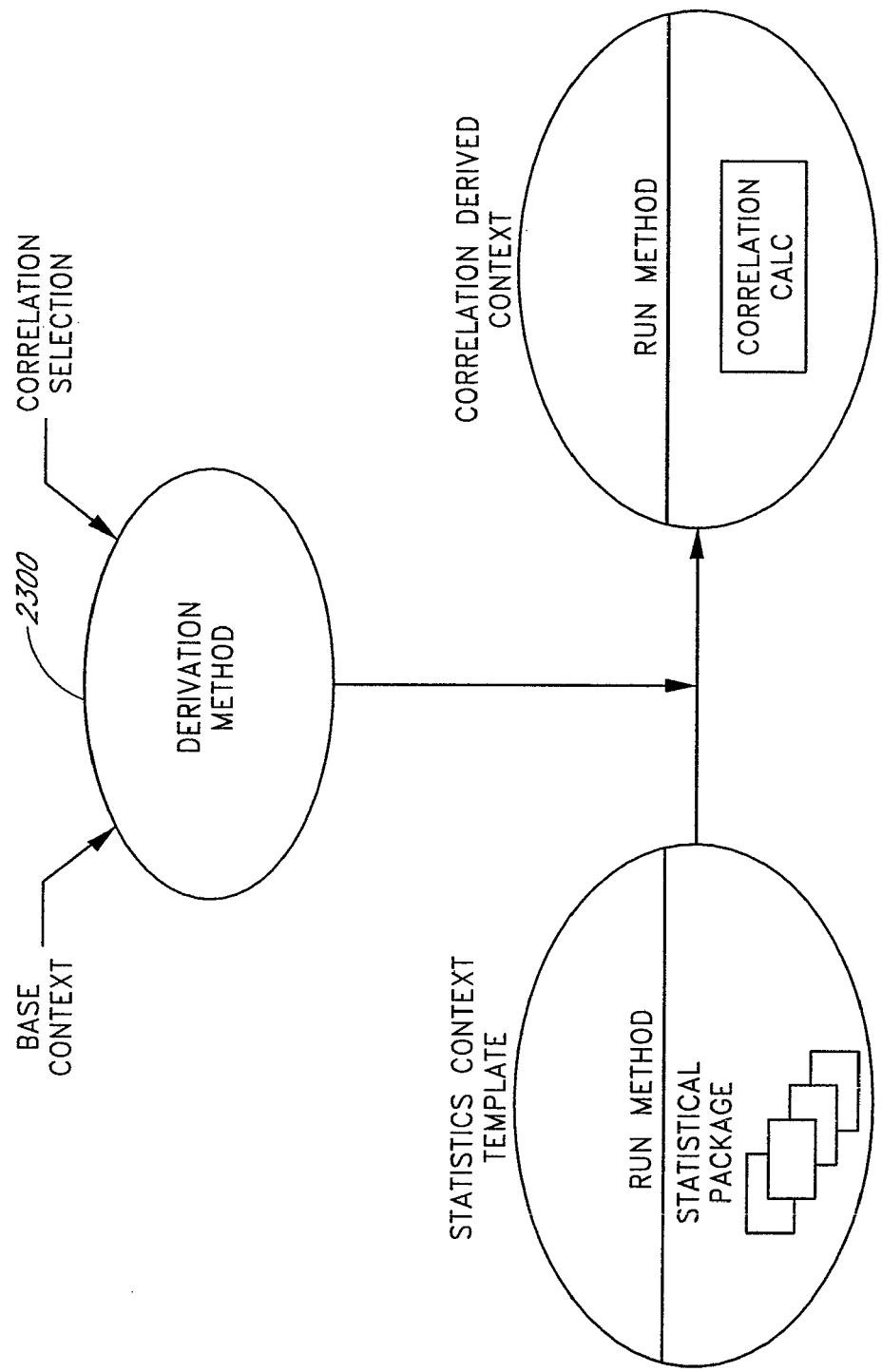

FIGS. 22-23 illustrate an embodiment of a statistics derived context and derivation method. A statistics derived context 2200 takes input 2202 that specifies details of a statistical calculation, then performs the calculation on a results store 2204 of a base context 2206. The statistics derived context 2200 returns as an output 2208 the results of the statistical calculation.

FIG. 22 illustrates a simple example of a statistics derived context. This context 2200 takes two integer inputs 2202 (i and j), which are interpreted as indices into the base context's input and output data structures respectively. The statistics derived context 2200 calculates the correlation between the ith entry in the base context's input and the jth entry in the base context's output, calculated across the results store 2204. The sole output 2208 is a real number containing the correlation score.

FIG. 23 illustrates the operation of a derivation method that produces a statistics derived context.

Extremize Derivation

Figure 24:
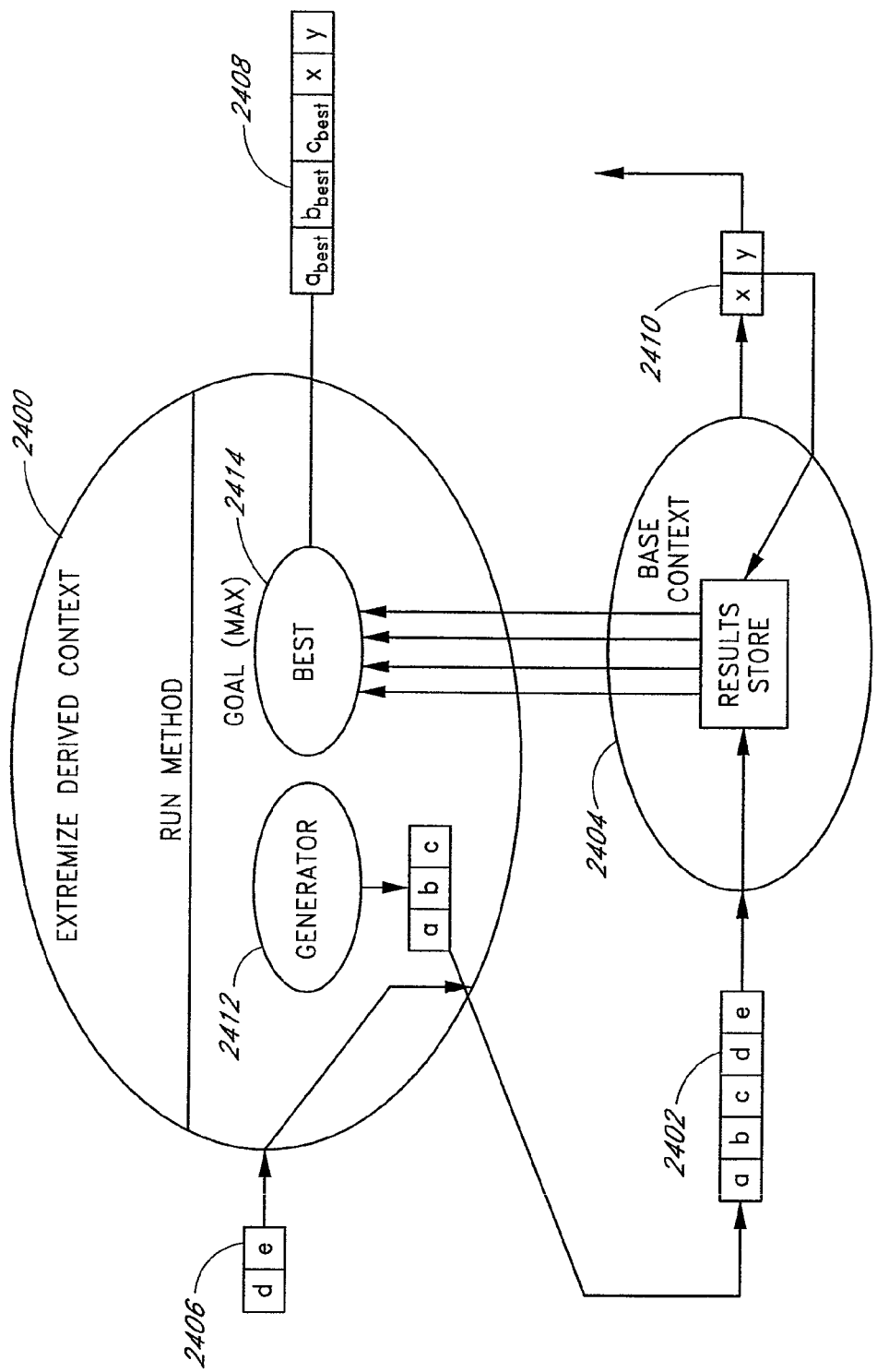
FIGS. 24-25 illustrate an embodiment of an extremize derived context and derivation method.
Figure 25:
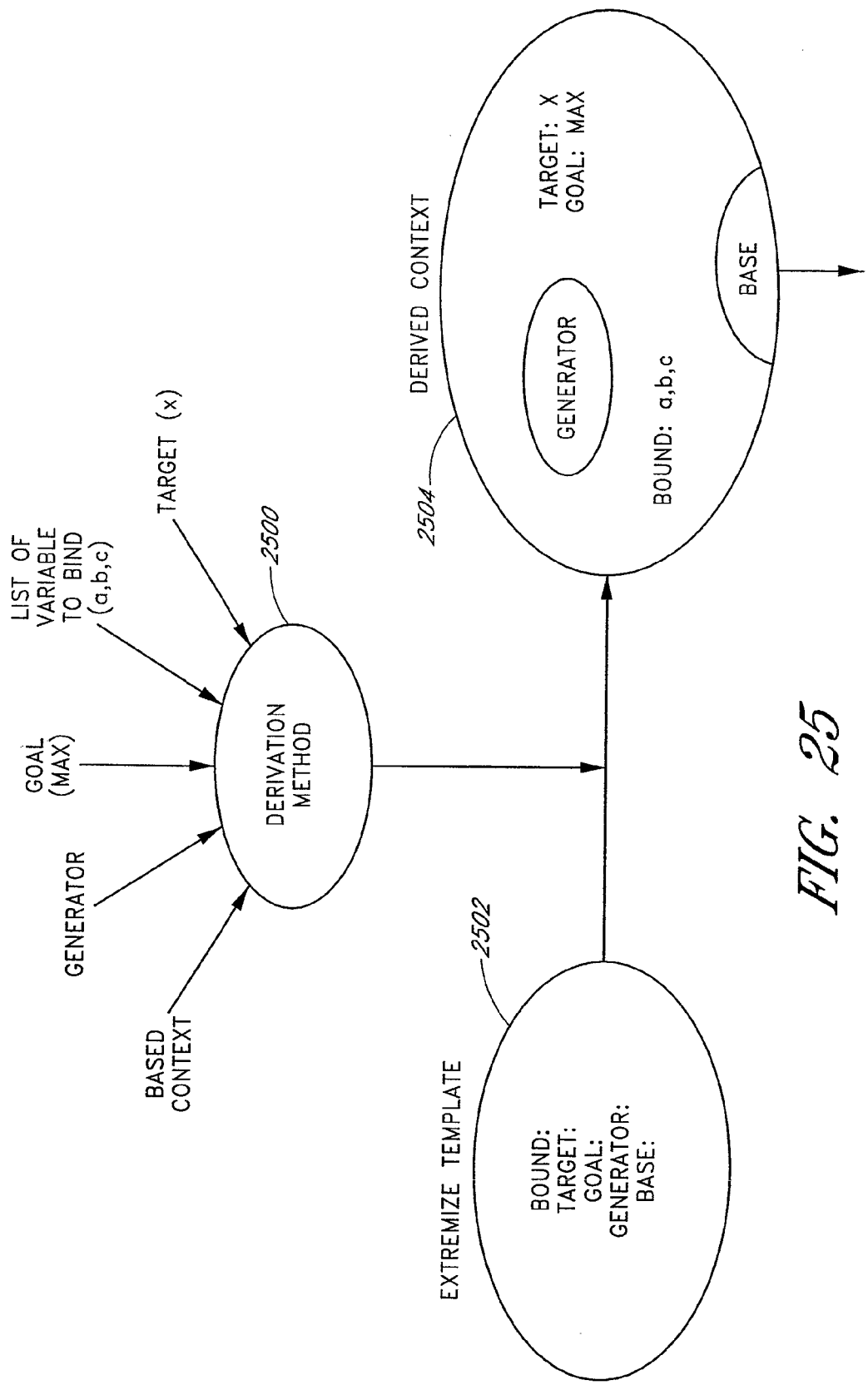

FIGS. 24-25 illustrate an embodiment of an extremize derived context and derivation method. An extremize derived context 2400 searches over a subset of inputs 2402 in a base context 2404 (holding the others fixed) to find a combination that achieves some objective for one output variable. For example, the object of such a search can be one of the following: (1) to minimize a specified output variable, (2) to maximize a specified output variable, (3) to minimize the absolute value of a specified output variable, (4) to maximize the absolute value of a specified output variable, or (5) to get as close to possible to forcing a specified output variable to achieve a specified value. A skilled artisan will appreciate, in light of this disclosure, other search objects that can be sought.

The extremize derived context 2400 takes as inputs 2406 the values for those entries that will remain fixed during the search. Outputs 2408 of the derived context 2400 comprise by values for the entries that are searched over (bound variables) in the case that best achieves the objective, and also base context outputs 2410 for that case.

An extremize derivation method 2500 takes as input the index of the output variable to search over and the input variables to vary during the search (bound variables). These bound variables will not appear in the inputs 2406 of the derived context 2400; instead, the outputs 2408 of the derived context 2400 contain new entries of the same type as the bound variable that report the values the bound variables have in the case which best achieves the desired objective. All outputs 2408 in the derived context 2400 have values taken from the same optimal case.

FIG. 24 illustrates the operation of the extremize derived context. In FIG. 24, the inputs A, B, and C of the base context 2404 are bound and subject to search. Consequently, the derived context 2400 takes only D and E as inputs. For a given specific input where D equals d and E equals e, a series of cases are run in the base context 2404 driven by an algorithm embodied in a generator 2412. The case which best achieves a goal 2414 of the search, which in this example is to maximize X, is used to form the output 2408 of the derived context 2400. As illustrated, such output 2408 comprises the values of A, B, and C that result in the best x (given d and e) and the values of x and y that result in this case.

FIG. 25 portrays the action of the extremize derivation method in creating an extremize derived context. The derivation method 2500 takes as input a reference to a base context, a generator to be used in searching, a list of inputs to bind, an output to use as a target, and a goal to achieve on the target output. These parameters are combined with a template 2502 for the extremize derived context to form the new derived context 2504.

Regret Derivation

Figure 26:
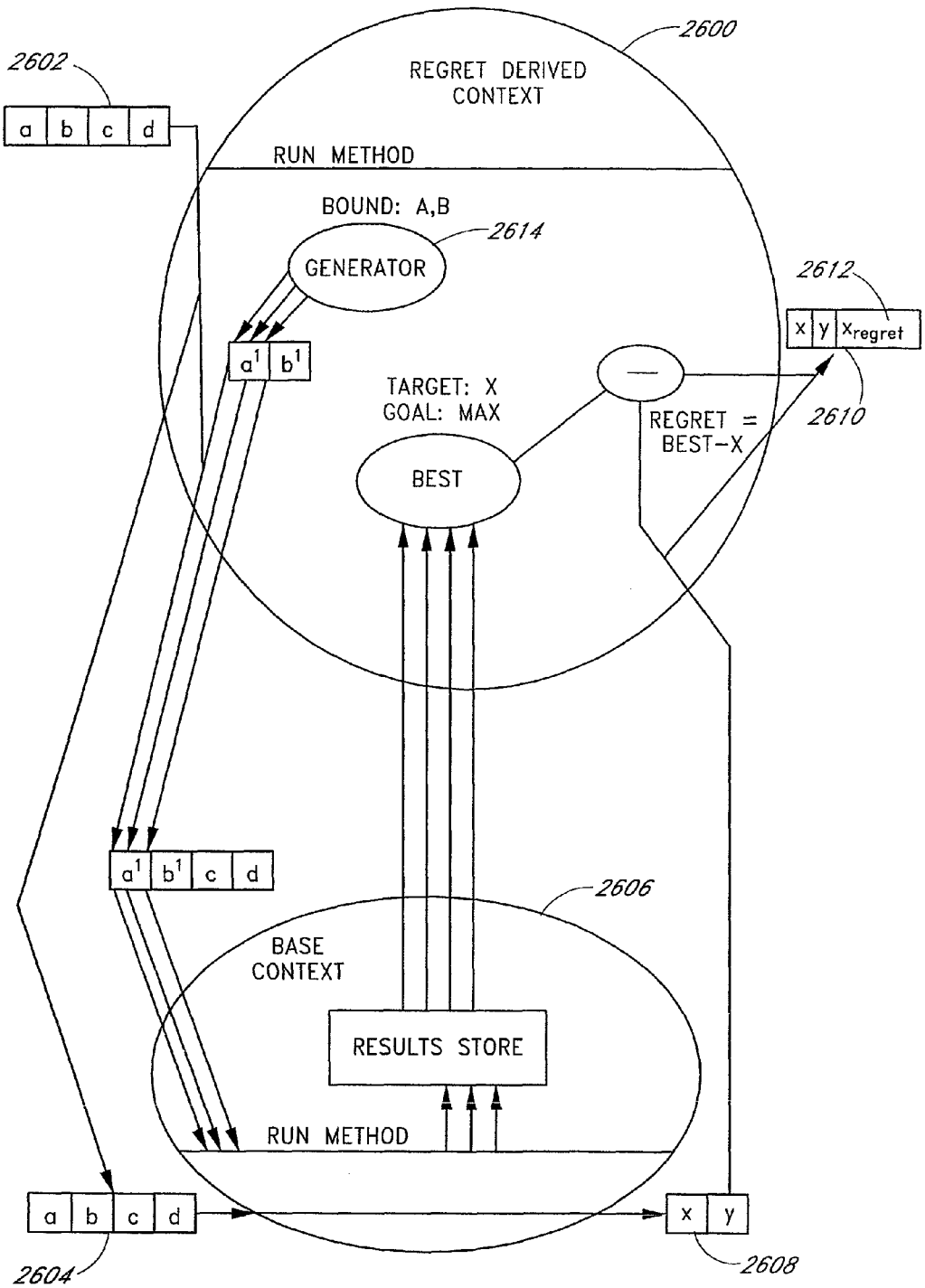
FIGS. 26-27 illustrate an embodiment of a regret derived context and derivation method.
Figure 27:
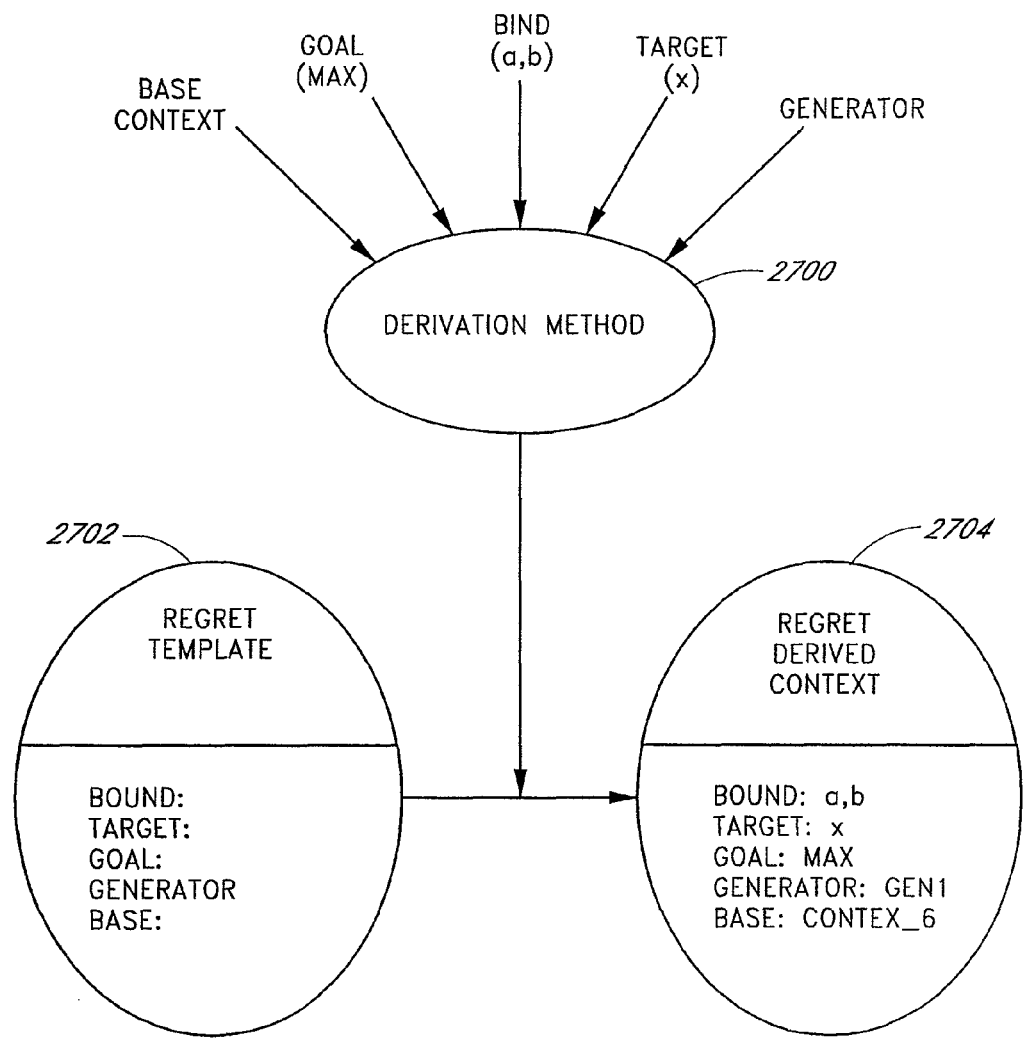

FIGS. 26-27 illustrate an embodiment of a regret derived context and derivation method. A regret derived context 2600 calculates the difference between the best case (the maximum or minimum of one output) that can be achieved on a base context compared with the output that results from particular inputs supplied to the derived context 2600. The regret derived context 2600 receives inputs 2602 that are equal to inputs 2604 received by a base context 2606. All outputs 2608 of the base context 2606 are also outputs 2610 of the derived context 2600. In addition, the derived context 2600 has another output known as the regret 2612. Like the extremize derived context 2400, a subset of the inputs 2604 to the base context 2606 are bound at derivation time, and a generator 2614 of the derived context 2600 searches for a best case varying these inputs. The value of the outputs 2608 calculated by the base context 2608 are calculated based on the inputs 2602 to the derived context 2600. The value of the regret 2612 is the absolute value of the difference between the best value achieved in the search (the minimum or maximum) and the value obtained when the inputs 2604 to the base context 2606 are set equal to the value of the inputs 2602 of the derived context 2600. The regret 2612 is preferably, therefore, non-negative.

FIG. 26 portrays the operation of an exemplary regret derived context. Here, A and B are bound and get values from a generator 2614. C and D have fixed values set by the input 2602 of the derived context 2600. The difference between x given A, B, C, and D and $x_{best}$ is the $x_{regret}$ 2612, the output in the derived context 2600 that is not taken directly from the base context 2606.

FIG. 27 diagrams the action of a regret derivation method in creating a regret derived context. A regret derivation method 2700 takes as input a reference to a base context, a generator to use for searching, indications of which inputs to bind, which output to use as a target, and whether the goal is to minimize or maximize that target. These parameters are combined with a template 2702 for regret derived contexts to create the specific regret derived context 2704.

Compose Derivation

Figure 28:
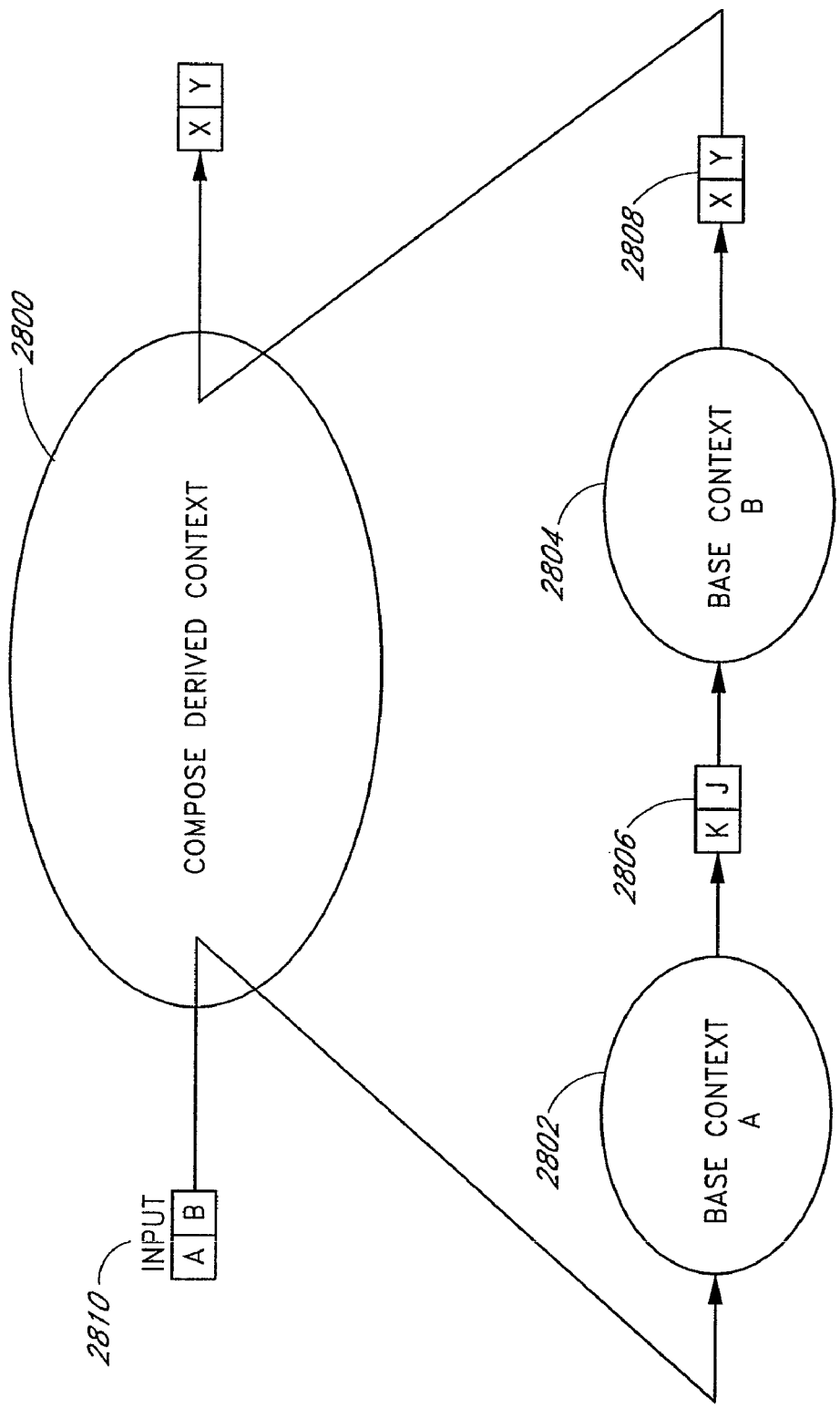
FIGS. 28-29 illustrate an embodiment of a compose derived context and derivation method.
Figure 29:
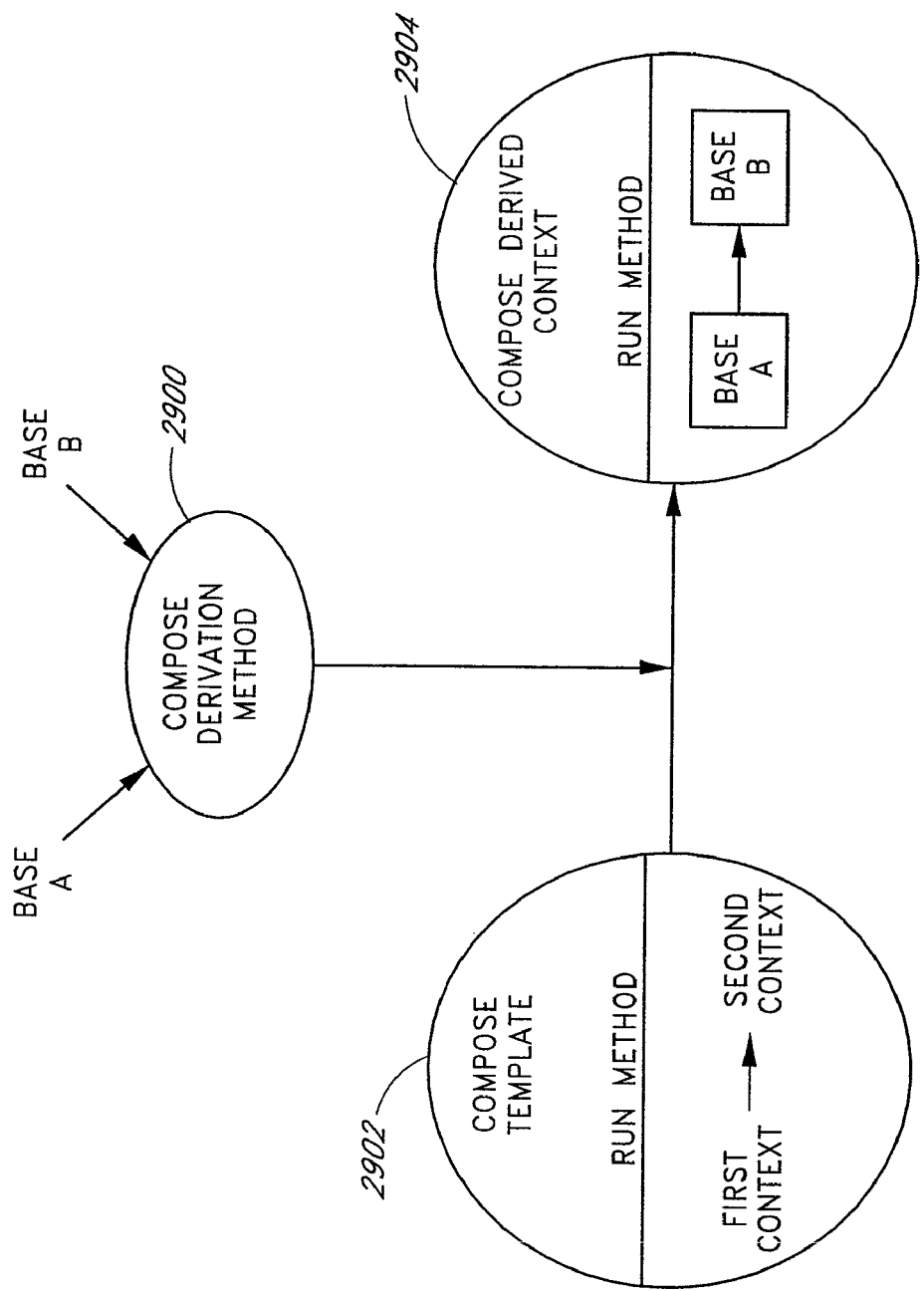

FIGS. 28-29 illustrate an embodiment of a compose derived context and derivation method. A compose derived context 2800 calls more than one base context, such as, for example, base context A 2802 and base context B 2804. The composed derived context 2800 calls the base contexts 2802 and 2804 sequentially, using the outputs 2806 of the first base context 2802 as inputs to the second base context 2804. A skilled artisan will appreciate, in light of this disclosure, that the compose derived context is not limited to composing only two base contexts, and that any number of base contexts can be chained together in this fashion. FIG. 28 exemplifies the operation of the compose derived context 2800. In one embodiment, the inputs 2810 to the derived context 2800 are copied to create the inputs to base context A 2802, whose output 2806 is copied to create the input for base context B 2804. The output 2808 of base context B 2804 is copied to create the output for the derived context 2800.

FIG. 29 portrays the operation of the compose derivation method. The compose derivation method 2900 takes as inputs references to multiple base contexts. The compose derivation method 2900 uses a template 2902 for a compose derived context to create a specific instance of the compose derived context 2904. The template 2902 comprises generic composition code that will call one base first and pass its outputs to use as inputs to a second base context and so on for as many base contexts are to be composed The derivation method 2900 places specific references to the base contexts in the template 2902 to create the new compose derived context 2904.

Difference Derivation

Figure 30:
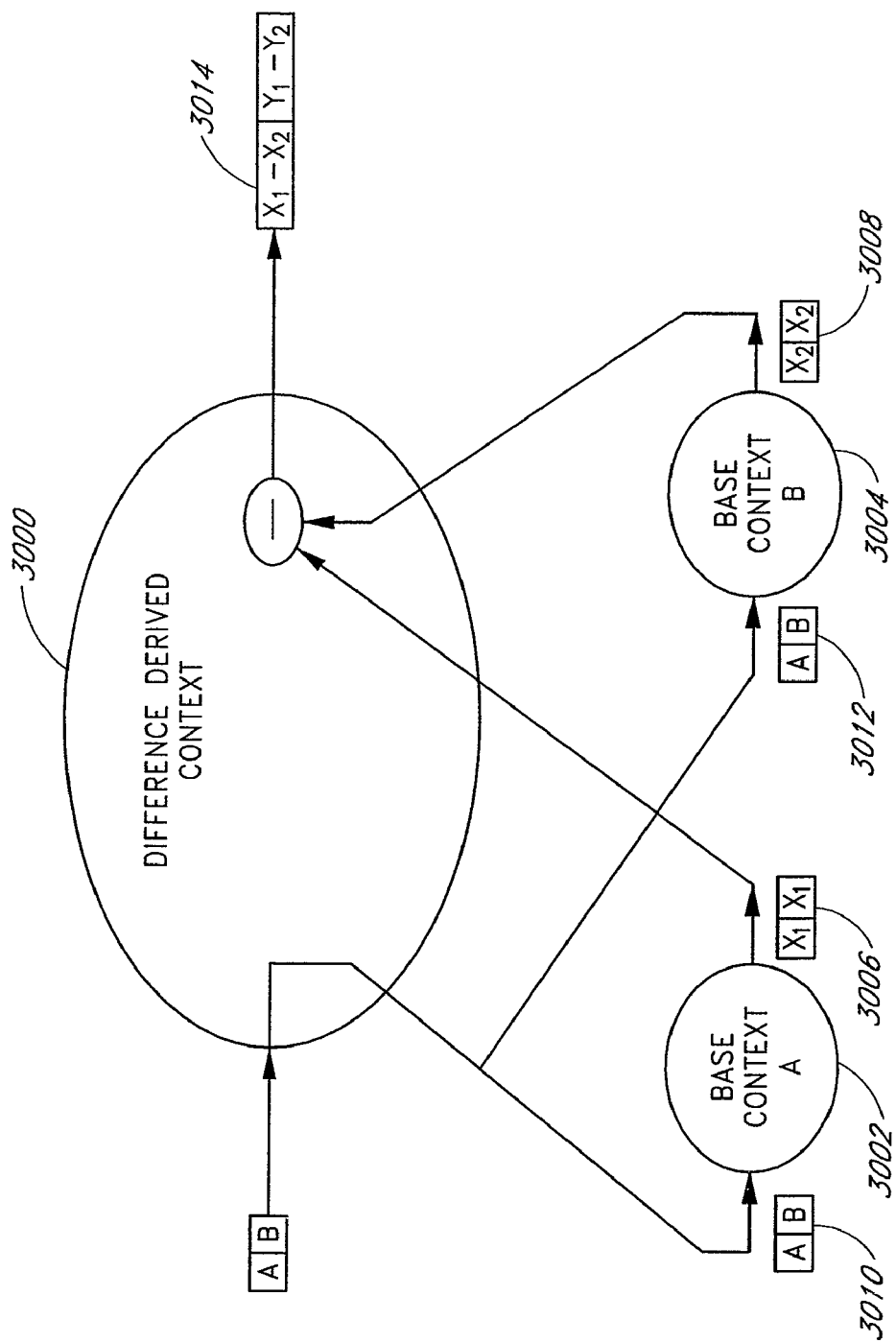
FIGS. 30-31 illustrate an embodiment of a difference derived context and derivation method.
Figure 31:
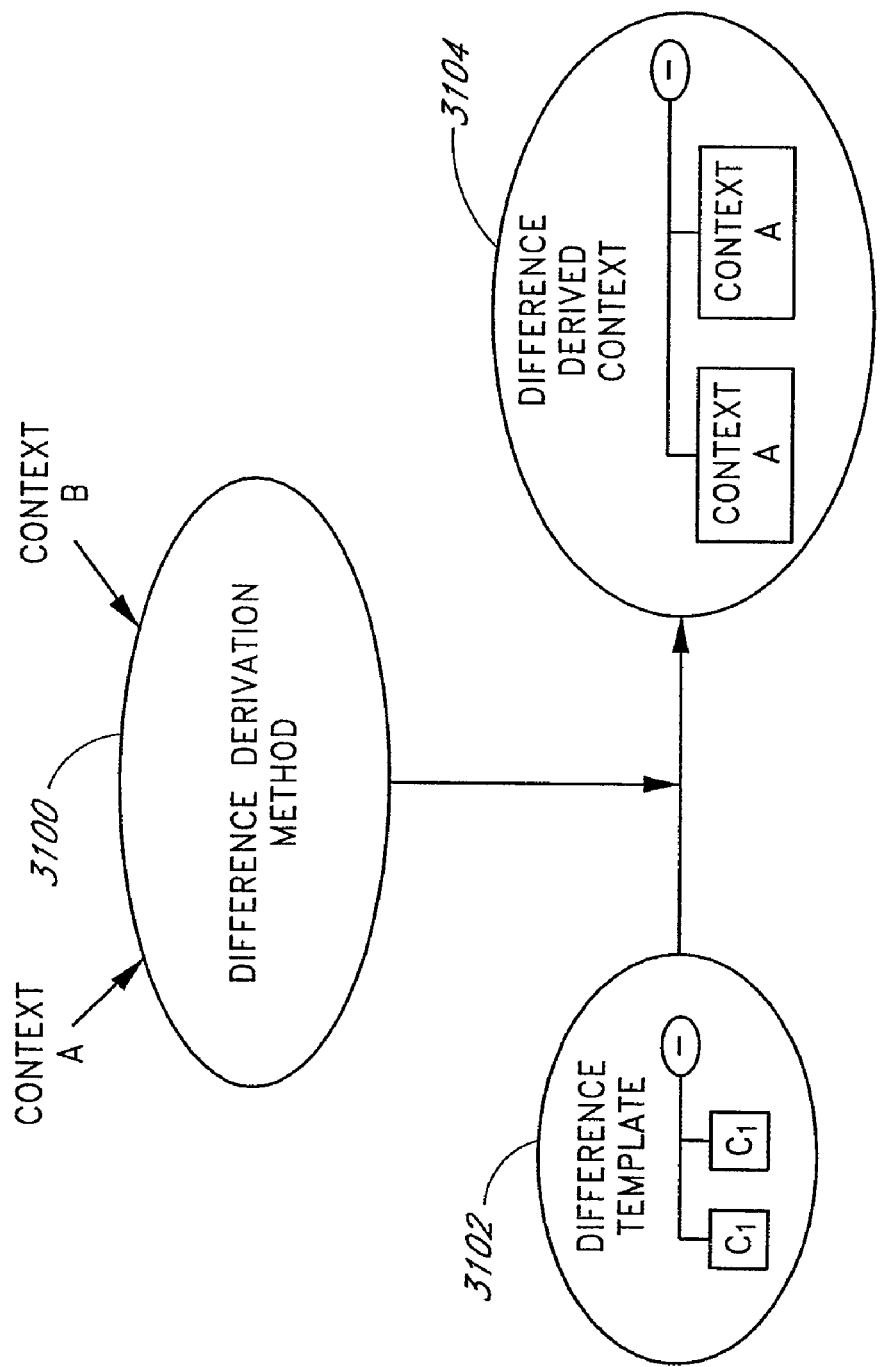

FIGS. 30-31 illustrate an embodiment of a difference derived context and derivation method. A difference derived context 3000 calls each of two base contexts 3002 and 3004 and computes the difference between the outputs 3006 and 3008 of the base context 3002 and 3004. FIG. 30 diagrams the operation of an example of such a context 3000. Each of the base contexts 3002 and 3004 takes inputs 3010 and 3012 A and B and produces outputs 3006 and 3008 $X_1$ and $Y_1$ and $X_2$ and $Y_2$. The difference derived context 3000 creates an output data structure 3014 with entries $x_1$-$x_2$ and $y_1$-$y_2$. In alternative embodiments, the difference derivation can be designed to utilize base contexts with non-identical inputs and outputs.

FIG. 31 illustrates the operation of a difference derivation method. The difference derivation method 3100 takes references to two contexts as input creates an instance of the derived context 3104 from a template 3102.

Iterative Application of Derived Contexts

Advantageously, derived contexts as described can optionally be applied iteratively to an arbitrary depth. Such iterative application of derived contexts creates a network of contexts that support the reasoning process of the reasoning system described herein.

Figure 32:
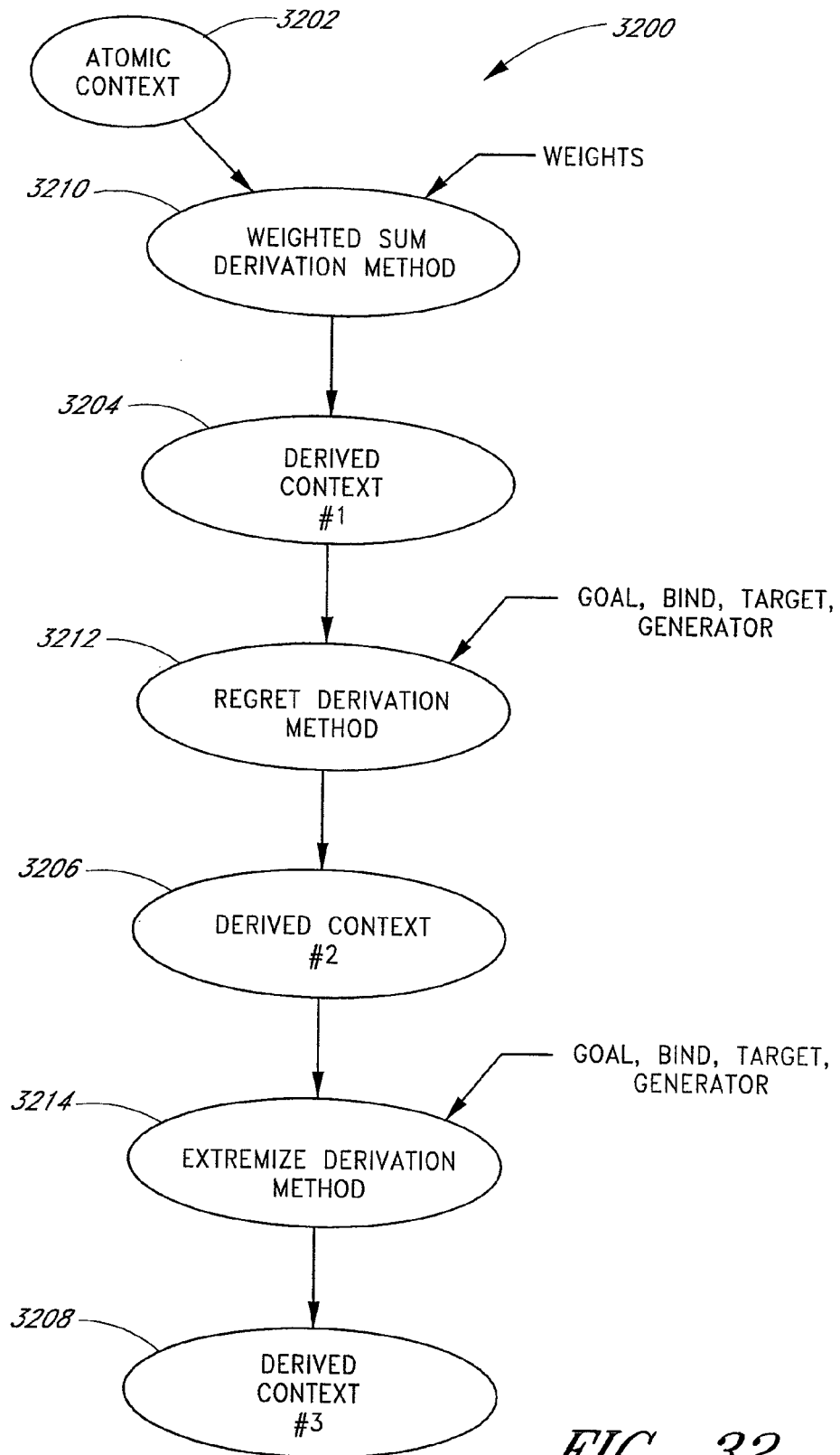
FIG. 32 illustrates an example of a network of contexts constructed by the reasoning system.

FIG. 32 illustrates an example of a network of contexts constructed by the reasoning system. FIG. 32 further illustrates how the use of multiple derivations can transform the information contained in a model of a problem to a form where conclusions can more readily be reached. As illustrated, a network of contexts 3200 comprises an atomic context 3202 and a number of derived contexts 3204, 3206, 3208. For purposes of illustration and not to limit the invention, the atomic context 3202 is, for example, a mathematical model implemented by a spreadsheet, where the model depicts information relevant to an important decision faced by a company. Among inputs to the mathematical model may be aspects of the decisions to be made and uncertainties about the future that will have an impact on both the future of the company and which decision would be best to make. Among outputs of the mathematical model may be several measures of success, such as, for example, profit or return on investment.

The atomic context 3202 is used to derive a new context, called here "derived context #1" 3204. The derived context #1 3204 is generated using a weighted sum derivation method 3210. The weighted sum derivation method 3210 creates a new output that is the weighted sum of several outputs from the mathematical model. Such a new output, in this illustrative example, provides a single score of how good a particular future circumstance is judged to be.

Derived context #1 3204, in turn, can be used as a base context to create another derived context #2 3206. In the illustrated example, derived context #2 3206 is created using a regret derivation method 3212. The regret derivation method 3212 takes as inputs the atomic context 3202, indications of which output to use for the regret calculation, and which inputs are part of the decisions as opposed to uncertainties. In derived context #2 3206, the new regret output will indicate for a given future scenario how much worse a given decision would be (in terms of the new weighted sum measure) than would the optimal decision for that scenario.

In the illustrated example, derived context #2 3206 is used as a base context to create another derived context, derived context #3 3208. An extremize derivation method 3214 is used to do create the derived context #3 3208. The resulting outputs of derived context #3 3208 are the result of a search for the scenario (the particular values of the uncertain inputs) which maximizes the regret.

The chain of derived contexts illustrated in the example of FIG. 32 produces a context (derived context #3 3208) which takes parameters describing a decision as its inputs and produces as output the worst case that could happen if the decision were implemented. In this example, the "worst case" is the case that results in the maximum regret for having made the decision. Advantageously, the computation is based upon the knowledge contained in the original model. However, the computation extends the capability of the original model by allowing the original model to answer a question that the model could not natively have answered. Accordingly, by employing the derived contexts described herein, the reasoning system can present information obtained from a mathematical model in a form that is different from the model's native form, and in a form that potentially is much more meaningful than the native form.

Advantageously, in accordance with embodiments of the invention, chains of derivations such as the example chain just described can be accomplished without making any changes to the original mathematical model code. A series of computational actions (invoking derivation methods) done as a direct result of user action on a user interface, or as a consequence of other computations being performed, can create derived context #3 3208, or any other derived context, if the necessary derivation methods are available in the reasoning system. Further, there are effectively an infinite number of such derivation chains, with the result that a reasoning system according to embodiments described herein and containing an adequate library of derivation methods can provide great flexibility in discovering the derivation chain that most advantageously transforms the knowledge inherent in the available model or models.

Representing Analytic Tools as "Contexts"

In one advantageous embodiment, a derivation method can be implemented such that the derivation method is a run method of a context. This embodiment, while advantageous, is not a required feature of the invention. In this advantageous embodiment, a library of derivation methods available in the reasoning system are a collection of contexts that are implemented internal to the system. Such contexts are not derived contexts, nor do they have an internal model. Additionally or alternatively, all types of analytic tools implemented as part of the reasoning system can be implemented as contexts, as is described below. Embodiments of this implementation have two representational requirements: (1) the various mechanisms supporting reasoning with computational experiments (derivation methods, generators, and database processors and filters in particular) are represented as subclasses or instances of the abstract type "Context". (In java this design optionally can be implemented by having Context be an interface rather than a class, which is then implemented by the various classes.) and (2) the data structures that are the inputs and outputs of Contexts are constructed so that they may have (references to) Contexts as elements or fields. Thus in particular, inputs and outputs may include references to generators and derivation methods as well as to Contexts that serve as wrappers for external models or have been derived from such.

Figure 33:
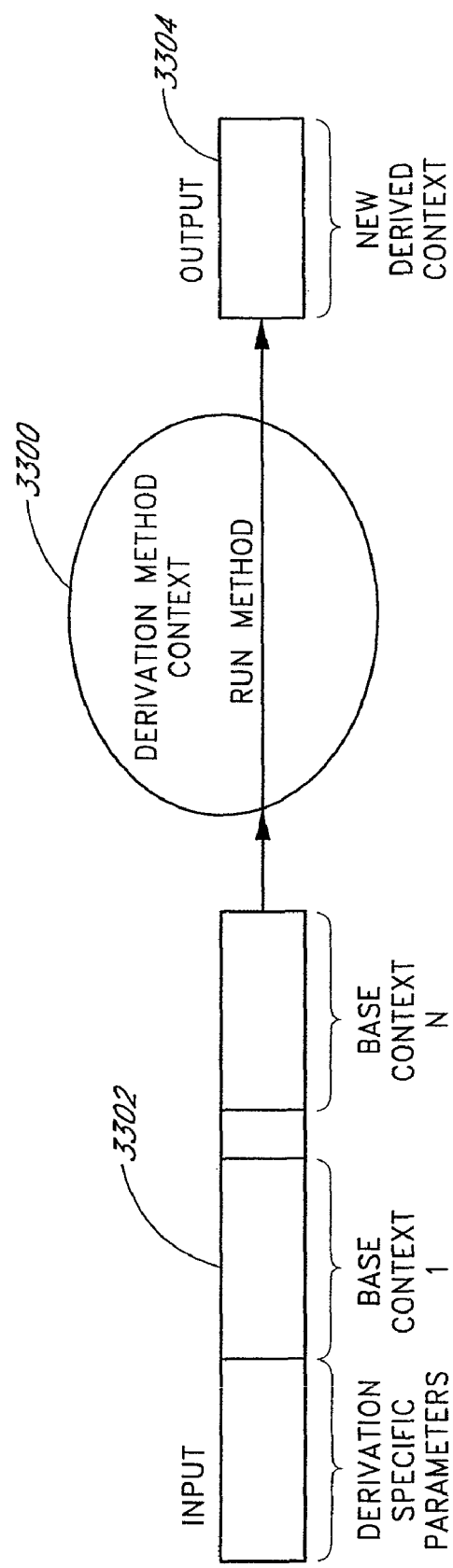
FIG. 33 illustrates how a derivation method can be implemented as a context.
Figure 34:
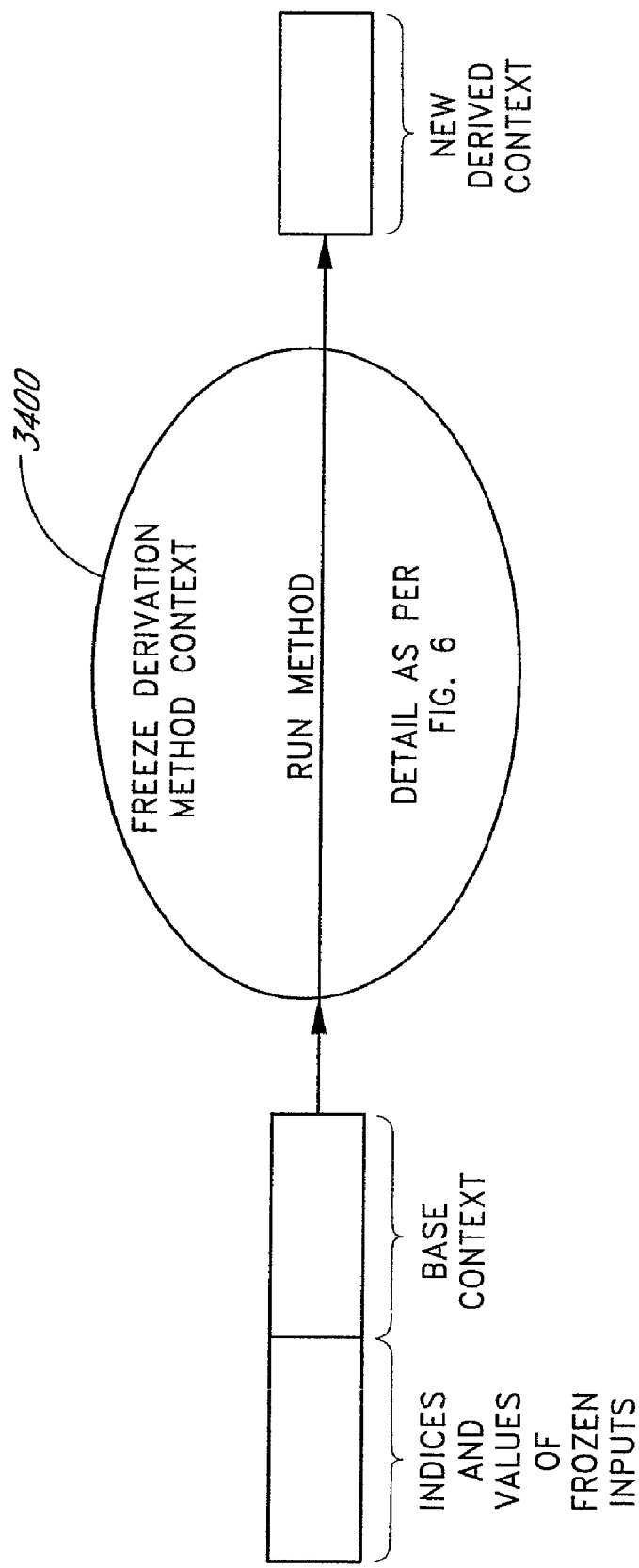
FIG. 34 illustrates the creation of a freeze derived context using a freeze derivation method context.

FIG. 33 illustrates how a derivation method can be implemented as a context. As illustrated, a derivation method context 3300 takes as input 3302 one or more base contexts and derivation specific parameters. The derivation method context 3300 produces as output 3304 a new derived context. As illustrated in FIG. 33, the input data structure 3302 comprises a series of fields with parameters specific to the derivation method followed by fields with references or pointers to one or more base contexts. A skilled artisan will appreciate, in light of this disclosure, that any other type of data structure can be used to represent the input 3302. The internal mechanisms for the run method of the derivation method context perform the construction of the derived context, as described above, and a pointer or reference to the new derived context is, in one embodiment, the sole entry in the output data structure 3304. Alternatively, other information may be included in the output data structure 3304. FIG. 34 illustrates the creation of a freeze derived context using a freeze derivation method context.

Figure 35:
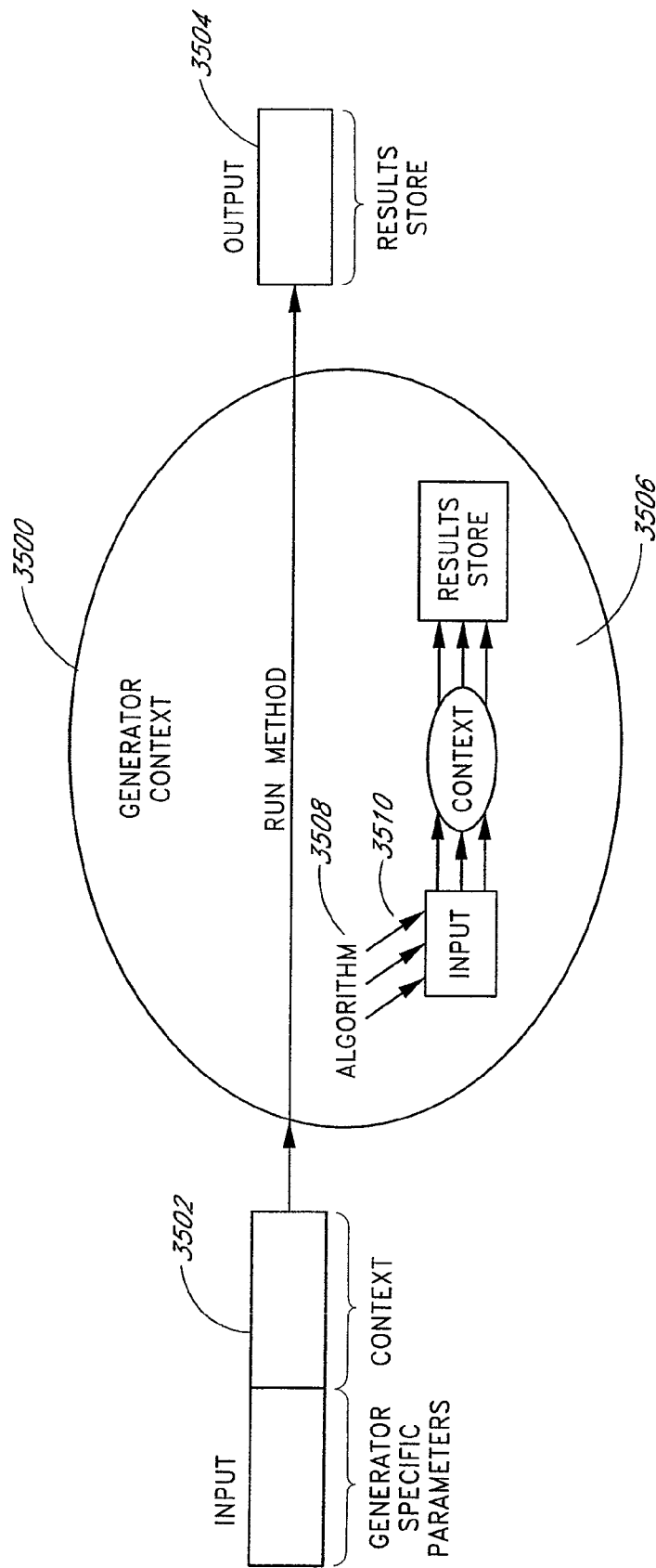
FIG. 35 illustrates one embodiment of a generator that is implemented as a context.

FIG. 35 illustrates one embodiment of a generator that is implemented as a context. As illustrated, a generator context 3500 takes as input 3502 generator specific parameters and another context. The generator context 3500 produces as output 3504 a results store, or a database of results from computational experiments that the generator has performed on the context. As illustrated, the generator context 3500 comprises a run method 3506 that implements an algorithm 3508 that defines the actions of the generator context 3500. Generally, the generator context 3500 feeds a series of inputs 3510 into the context in order to create the results store 3504. When the algorithm 3508 finishes processing, the final results store 3504 is then returned.

Figure 36:
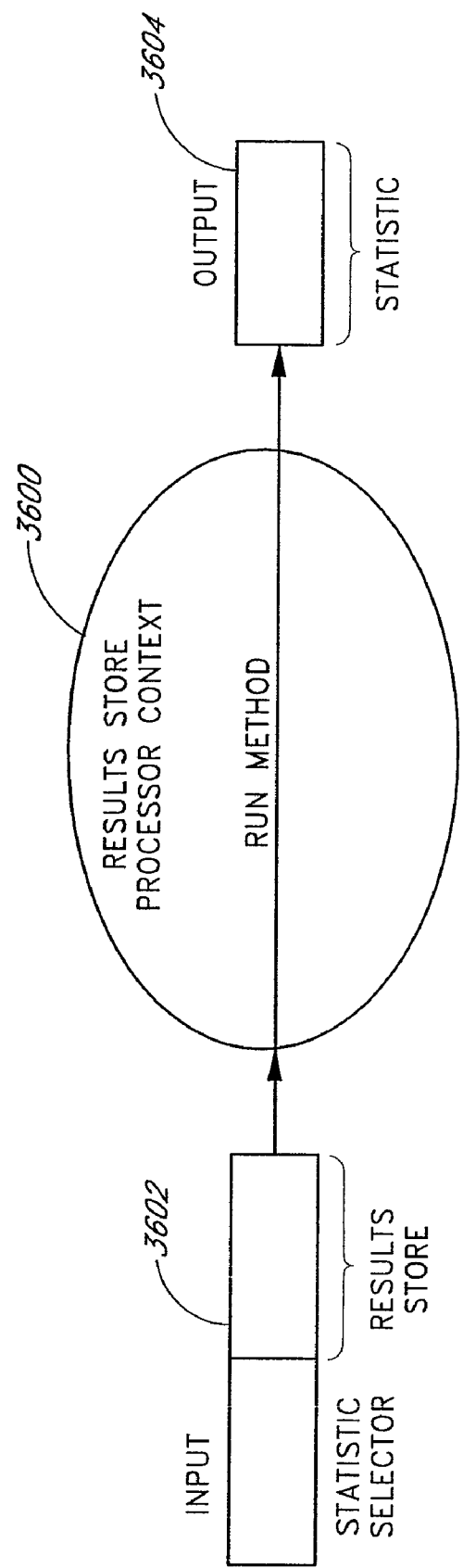
FIG. 36 illustrates one embodiment of a results store processor that is implemented as a context.
Figure 37:
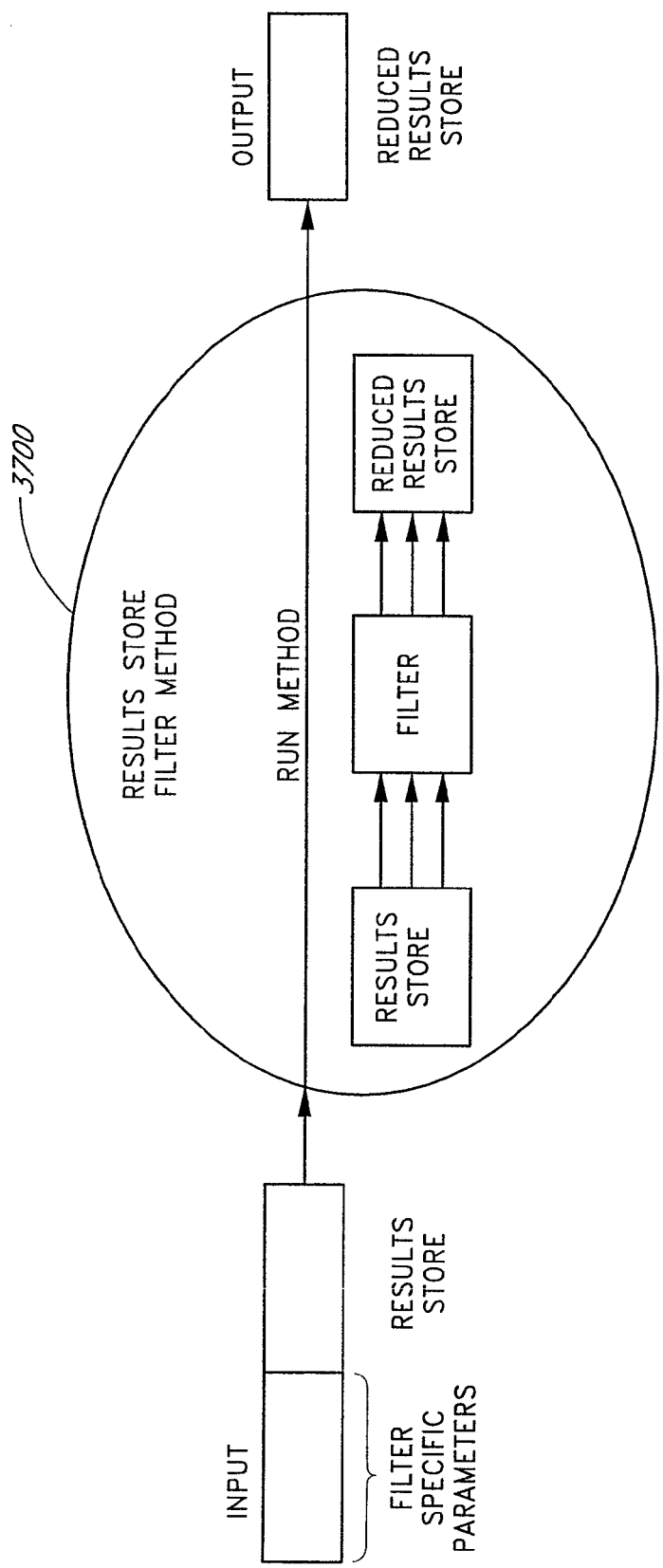
FIG. 37 illustrates an embodiment of a results store filter method.

FIG. 36 illustrates one embodiment of a results store processor that is implemented as a context. As illustrated, a results store processor context 3600 takes as input 3602 a statistic selector and a results store. The results store processor context 3600 produces as output 3604 a statistic. In this example, a results store is a database of results from computational experiments performed using a context. In this example, a statistic is some summary of information from the results store, such as, for example, a mean, a median, a standard deviation, and the like. One example of a results store processor is a results store filter, which takes a results store, performs some specific operation on the results store, and returns another results store. Preferably, the returned results store is a subset of the input results store. FIG. 37 illustrates an embodiment of a results store filter method.

Advantageously, any service that takes multiple contexts or derivation methods as input and returns a new context or derivation method can be represented as a context, as described. Preferably, therefore, most analytic services within the reasoning system are implemented as contexts. Advantageously, representing analytic services as run methods of contexts allows the analytic services to be uniformly used as inputs to derivation methods that create new contexts with yet more complex analytic functions. In particular, the compose derivation method 2800 as described above can be use to combine a series of analytic services to create a new service.

Figure 38A:
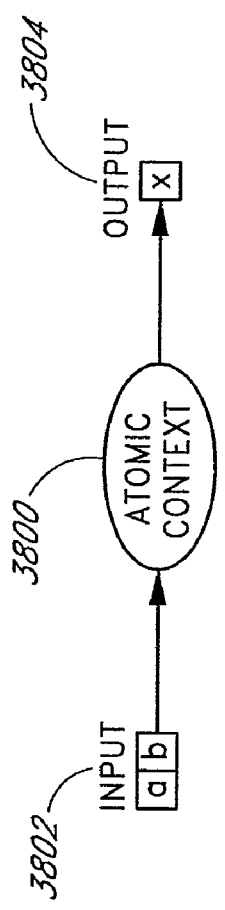
FIGS. 38A-38F illustrate several advantageous examples in which the reasoning system can be extended because analytic services are represented as contexts.
Figure 38B:
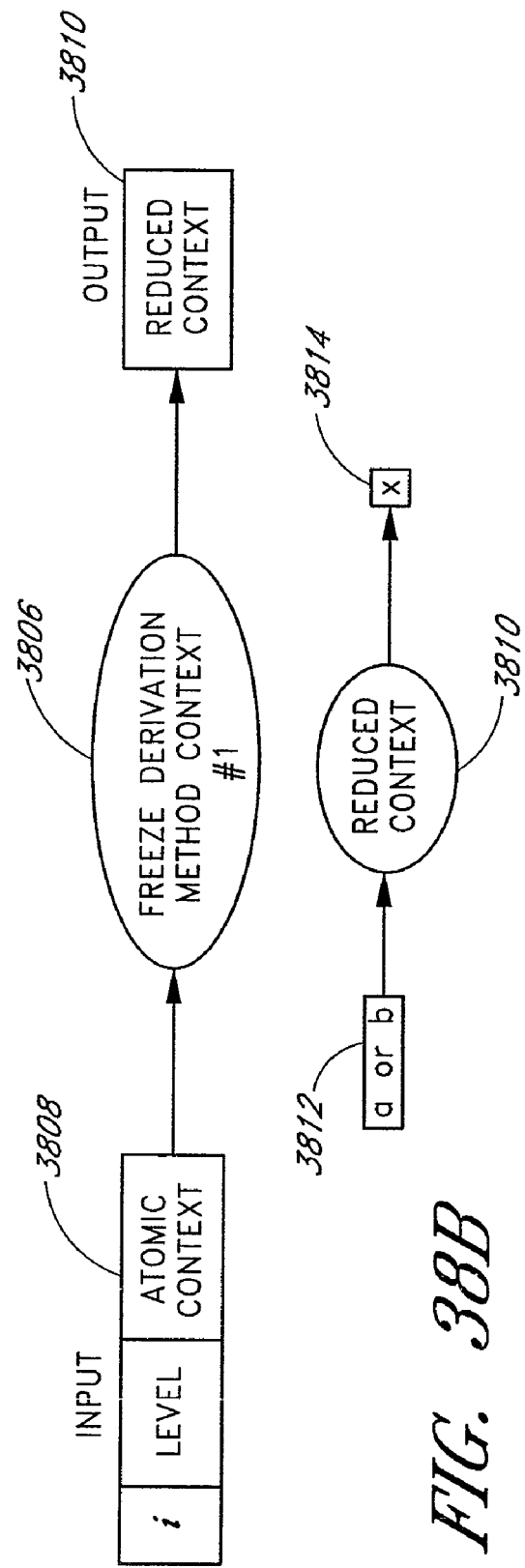

As a consequence, a reasoning system with the capability to represent analytic services as contexts can provide extended functionality. FIGS. 38A-38F illustrate several advantageous examples in which the reasoning system can be extended because analytic services are represented as contexts. FIG. 38A presents a simple atomic context. The atomic context 3800 takes inputs 3802 with two fields, a and b. The atomic context 3800 returns outputs 3804 with one field, x. As described above, a freeze derivation method can create a new context with only one input, either a or b, with the other set to some specific fixed value. FIG. 38B presents a freeze derivation method context. The illustrated freeze derivation method context 3806 takes as inputs 3808 the index (i) of the input to freeze, the level at which to freeze it, and a pointer or reference to the atomic context to use as the base context. The freeze derivation method context 3806 returns a derived context 3810 that is herein referred to as a reduced context. The reduced context 3810 takes a single input 3812 (either a or b) and returns one output 3814, x.

Figure 38C:
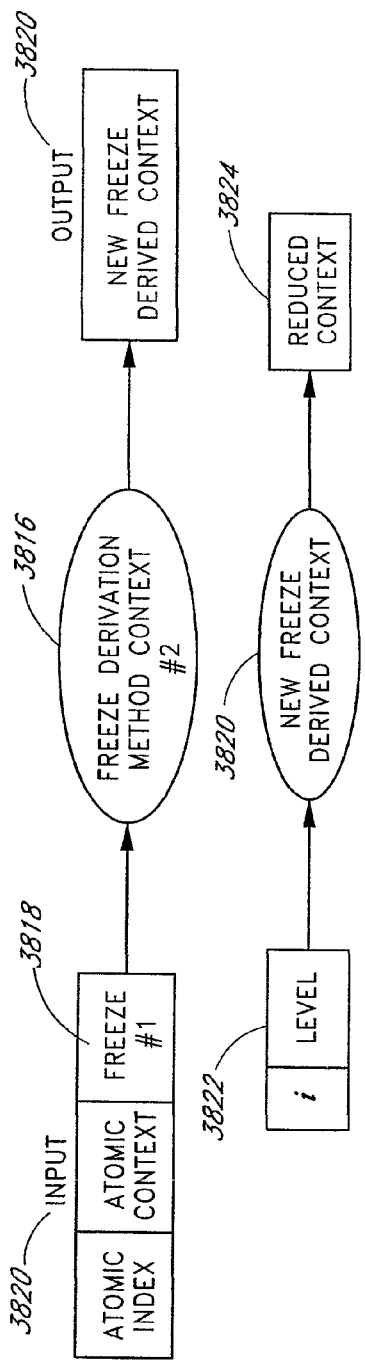

Advantageously, because the freeze derivation method context 3806 is a context, it is legitimate to use the freeze derivation method context 3806 as a base context for some new invocation of a derivation method. FIG. 38C illustrates the use of a freeze derivation method context as a base context for a new invocation of a derivation method. In the illustrated invocation, the base context 3818 is the instance of the freeze derivation context from FIG. 38B. The freeze derivation method context #2 3816 also receives as input 3820 parameters that give the index of the atomic context in FIG. 38B and a reference to the atomic context itself, which is the value to freeze this input at. The result of this second use of the freeze derivation method is a derived context referred to as New Freeze Derived Context 3820. As indicated by FIG. 38C, the New Freeze Derived Context 3820 takes as inputs 3822 i and level and returns a reduced context 3824 that results from freezing input i of the atomic context to the value "level."

Figure 38D:
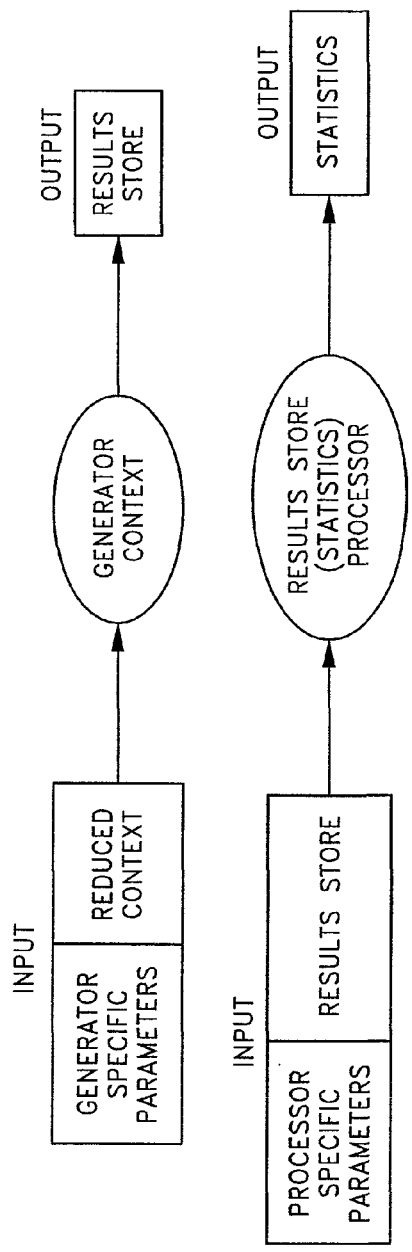

FIG. 38D illustrates how a reduced context can be used as input, to a generator context to produce a results store. FIG. 38D further illustrates that the results store can be used as input to a statistics results store processor to create statistics about the data that the results store contains.

Figure 38E:
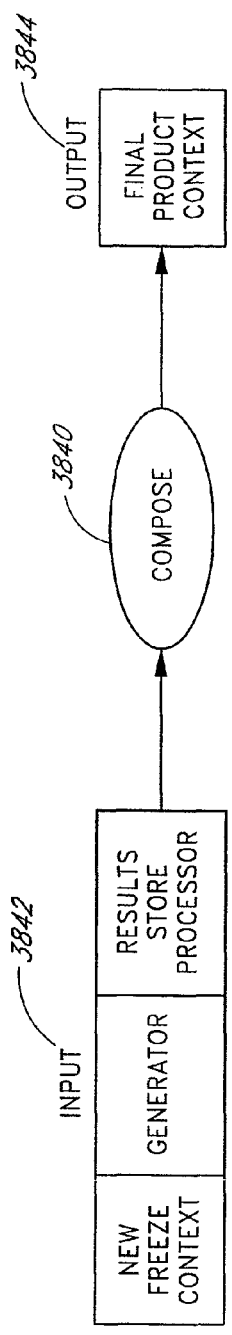

FIG. 38E illustrates a compose derivation method context that takes multiple contexts as input and creates another derived context. As illustrated, the compose derivation method context 3840 takes as input 3842 a reference to the new freeze context 3820, a reference to a generator, and a reference to a results store processor. In this embodiment, the freeze context, the generator, and the results store processor are each contexts. The compose derivation method context 3840 creates a new derived context herein referred to as the final product context 3844. The compose derivation described above with reference to FIG. 28 takes two contexts as input. However, as explained above, a compose derivation can also take an arbitrary number of contexts and compose them together in a specified order. Alternatively, an arbitrary number of contexts can be composed together by repeated application of a compose derivation that accepts two inputs.

Figure 38F:
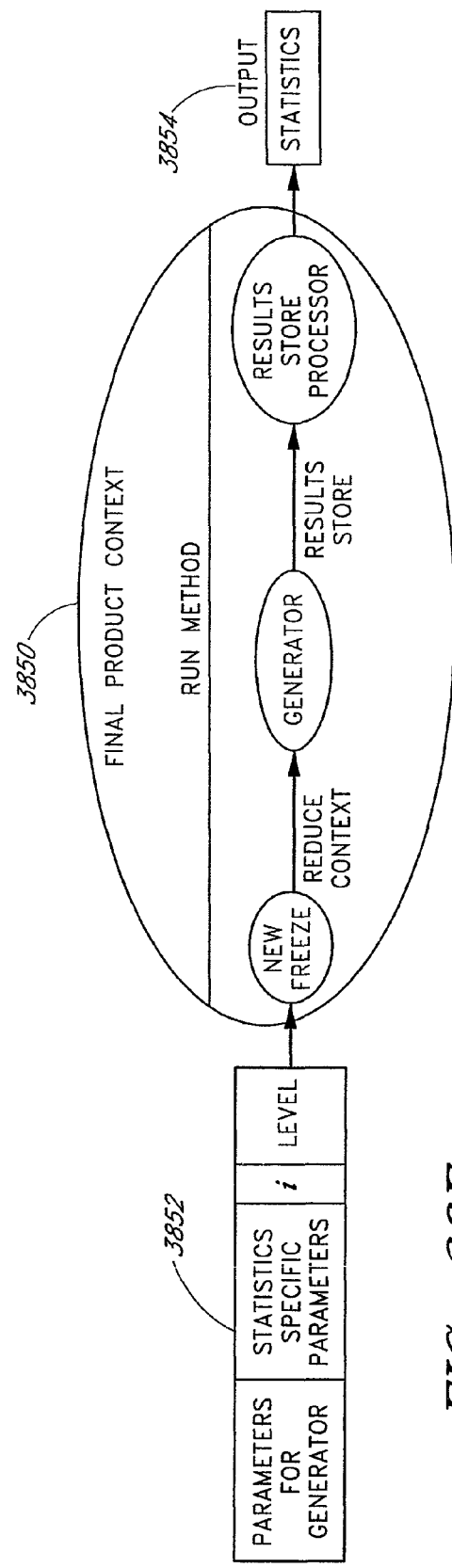

FIG. 38F illustrates a "final product" context that is the composition of three other contexts. As illustrated, a final product context 3850 takes as inputs 3852 generator parameters, statistics specific parameters, a variable i, and a variable level. Here, i and level are the same inputs as in FIG. 38C (3822). They indicate which input of the original atomic context is to be frozen, and the level at which to freeze it. The final product context 3850 returns as output 3854 statistics. Specifically, the output statistics 3854 relate to cases run on a restricted set of inputs to the atomic context. The final product context 3854 provides a basis for searching for specific inputs to the atomic context, such as lines through two dimensional input space with very high contrast or volatility. For models with very large dimensional inputs, this can be an important feature to assist in discovering properties of the model.

Advantageously, the ability to represent analytic tools as contexts enhances the features of the final product context 3850. In general, derivation methods operating on atomic contexts or derived contexts cannot easily be designed to have the powerful capabilities of contexts that employ analytic tools that are contexts. The specific capabilities illustrated by FIGS. 38A-F are examples only and do not limit the scope of the invention. An unlimited number of sequences of context run method calls, where the contexts can be models, analytics tools, or a complex combination of them, can be chained together to create new analytic capabilities, without new programming within the code of mathematical models or other external sources of knowledge.

Bookmarks

Embodiments of the reasoning system provide bookmarks, or software objects that represent a point or a collection of points in the space of possible inputs to a context. Advantageously, bookmarks assist in navigation through the complex universe of contexts and cases that can be stored in embodiments of the reasoning system.

A bookmark is associated with a context, and among the services offered by all contexts is keeping a list of current bookmarks and providing methods for adding, searching through, or deleting bookmarks. A bookmark comprises a unique alphanumeric identifier and a data structure which specifies the case or cases being bookmarked. The identifier can be provided by a user, by an automated process, or by a user assisted by an automated process. A bookmark can have other attributes in addition to a unique identifier and a data structure specifying the case of cases being bookmarked.

In one embodiment, the reasoning system supports three types of bookmarks as described below.

A "simple bookmark" is a data structure identical to that used as input for the context, where all values are appropriate to use as input to the context. Such a bookmark is for a single case for the context. For example, if the context accepts inputs with 4 real numbers $<a, b, c, d>$, a simple bookmark might be $<2, 4, 5.5, 0>$ assuming those individual numbers did not violate any constraints so that this list would be a valid input to the context.

A "wild bookmark" is a data structure identical in structure to that used as input for the context, where all values are either appropriate to use as input to the context or are special values known as wildcards taken to mean "unspecified". Such a bookmark indicates the collection of points in the input space for that context that would be obtained by replacing all wildcards with some appropriate value. For an input data structure that is a list or vector of 4 numbers, an example of a wild bookmark would be $<1, *, 4.5, *>$, where '*' means any legal value, which denotes a 2-dimensional plane of points in the input space.

A "range bookmark" has a data structure consisting of 2 wild bookmarks, one of which is interpreted as setting a high limit and the other a low limit on the range of points denoted. Such a bookmark denotes a rectangular solid region of input space. For the context that has inputs consisting of 4 numbers, an example would be $\{<1.0, *, 2., *>, <3.0, 4.5, 3.0, *>\}$, which denotes points $<a, b, c, d>$ obeying the constraints $1.0<a<3.0; b<4.5; 2.<c<3.0$; with no constraints on d.

Bookmarks can be created by a variety of means. For example, a user can create a bookmark directly by specifying each value in a bookmark of a given type. A bookmark can be created from the values of a series of graphical widgets, such as, for example, slider bars. Thus a graphical image may be controlled by a bank of slider bars, with a slider from every input number not represented by an axis or other feature of the graph. The set of slider bar values may be translated into a wild bookmark, where those inputs without a slider bar to draw a value from get the value "wild". Bookmarks can be created from searches through spaces of computational experiments. The result of a search to maximize or minimize an output could be a simple bookmark. A search that finds a bounding surface or manifold can result in a wild bookmark, and one that finds a multidimensional box that bounded a volume of points could be represented by a range bookmark. Bookmarks can be created from other bookmarks by editing or other actions. Bookmarks can be imported from one context to another. The fields in the bookmark in the importing context get values from any fields in the bookmark in the exporting context that are the same variable, either due to some naming convention or user assertion. All entries in the importing context that get no value assigned by the rule are set to wildcard values.

Bookmarks can be consumed by various computational services. For example, the user can request that a graph be created with input values specified by a bookmark A derivation method can accept a bookmark as a parameter specifying an action of the derivation method. For example, a freeze derivation can accept a wild bookmark where a wildcard is interpreted as meaning not to freeze that input, and all other values specify the value to freeze the corresponding input at. Other analytic tools can also accept bookmarks and have actions of the analytic tools specified by the accepted bookmarks. A generator based on a search can use a simple bookmark as a starting point, for example.

For example, if the inputs to a context consist of N entries of appropriate type, a bookmark for that context would also be a collection of N corresponding entries, plus additional information, such as a name. Preferably, each entry in a bookmark is either a valid input for the corresponding entry for that context or a "wildcard" indicating any valid value for the corresponding entry of the context. Thus, if the inputs for a context were N floating point numbers, a bookmark can represent a point in that input space by providing N values and no wildcards. A bookmark can represent a line by providing N−1 values and one wildcard. A bookmark can represent a plane by providing N−k values and k wilcards. By combining bookmarks such that one bookmark represents a high limit and another bookmark represents a low limit, more complex regions in the input space of a context can be represented. Bookmarks advantageously provide assistance to users in navigating through complex spaces of possible computational experiments. Bookmarks can be used to record cases or collections of cases that the user has discovered to be interesting or salient, allowing the user to return to such cases later.

Bookmarks can be generated by automated search processes and then browsed by the user to see what the computer has discovered. Bookmarks created by recording, for example, the positions of a series of slider bars driving a visualization, can be used as input to other features, for example derivation methods. Bookmarks can be translated from one context to another by copying values for equivalent entries, and setting entries that have no equivalent in the original bookmark to wildcard values.

While embodiments of the invention have been described herein to illustrate the invention, the invention is not limited to the described embodiments. A skilled artisan will appreciate, in light of this disclosure, how to make and implement other embodiments in accordance with this disclosure. Furthermore, while certain embodiments have been described with certain advantageous features, a skilled artisan will appreciate, in light of this disclosure, that many advantageous features can be omitted without departing from the scope of the invention. Similarly, an embodiment need not achieve all advantages that have been described herein in order to fall within the scope of the invention. Nothing described herein is considered to be an essential limitation on the scope of the invention except to the extent that the limitation appears in a claim. Moreover, any limitation that appears in a claim limits the scope of that claim without affecting the scope of other claims, except to the extent that dependent claims incorporate all of the limitations of the claims upon which they depend.

What is claimed is:

1. A computer including a reasoning system configured to drive computational experiments, the system comprising:
   at least one atomic context having an abstract data type and comprising:
   a reference to at least one mathematical model that defines a computational experiment and that computes answers to the computational experiment, wherein the mathematical model is located externally to the atomic context and is capable of computing answers to the computational experiment without being associated with the atomic context;
   at least one interface to the mathematical model; and
   at least one method configured to run operations on the mathematical model;
   wherein the atomic context is configured to drive experiments using the mathematical model at least partially by providing inputs to the mathematical model, changing input values to the mathematical model, and iteratively instructing the mathematical model to run a computational experiment and to return at least one output of the computational experiment and wherein the atomic context does not alter the mathematical model; and
   a plurality of derivation methods, each derivation method configured to receive at least one reference to a base context and to create a derived context at least partially based on the base context, the derived context having the same abstract data type as an atomic context and being configured to:
   cause the performance of at least one computation at least partially by invoking the base context and providing at least one input to the base context;
   receive at least one output from the base context;
   perform at least one transformation on at least one input to or on at least one output from the base context; and
   return at least one output of the computation.

2. The reasoning system of claim 1, wherein the derived context created by the derivation method is further configured such that the derived context can be a base context of another derived context.

3. The reasoning system of claim 2, wherein each derivation method is further configured to define, at least partially by using a template, the at least one transformation to be performed by the derived context created by the derivation method.

4. The reasoning system of claim 3, wherein the at least one transformation defined by at least one of the derivation methods comprises a freeze operation in which at least one of the inputs provided by the derived context to the base context is a stored constant value.

5. The reasoning system of claim 3, wherein the at least one transformation defined by at least one of the derivation methods comprises a weighted sum operation in which at least one of the outputs of the derived context is a calculated weighted sum of at least one of the outputs of the base context.

6. The reasoning system of claim 1, wherein at least one of the derivation methods comprises a compose derivation method that receives at least a first reference to a first base context and a second reference to a second base context and creates a derived context configured to invoke the first base context, to receive output from the first base context, to invoke the second base context, and to provide as input to the second base context the output of the first base context.

7. The reasoning system of claim 1, wherein at least one of the derived contexts created by at least one of the derivation methods comprises an input transform configured to transform at least one input to the derived context and to provide the transformed input to the base context as a base context input.

8. The reasoning system of claim 1, wherein at least one of the derived contexts created by at least one of the derivation methods comprises an output transform configured to transform at least one output received from the base context and to return the transformed output as an output of the derived context.

9. The reasoning system of claim 1, wherein at least one of the derived contexts created by at least one of the derivation methods comprises an input transform and an output transform, the input transform configured to transform at least one input to the derived context and to provide the transformed input to the base context as a base context input, the output transform configured to transform at least one output received from the base context and to return the transformed output as an output of the derived context.

10. The reasoning system of claim 1, wherein the reasoning system is further configured to allow the creation of a derivation chain comprising at least three derived contexts, in which a first derived context references an atomic context, a second derived context references the first derived context, and a third derived context references the second derived context, the third derived context providing at least one output that depends at least partially on at least one computation performed by each of the atomic context, the first derived context, the second derived context, and the third derived context.

11. A computer-aided reasoning system comprising~
a plurality of atomic contexts, that each atomic context have an abstract data type and comprise:
   a reference to at least one mathematical model that defines a computational experiment and that computes answers to the computational experiment, wherein the mathematical model is located externally to the atomic context and is capable of computing answers to the computational experiment without being associated with the atomic context;
   at least one interface to the mathematical model; and
   at least one method configured to run operations on the mathematical model;

wherein each atomic context is configured to drive experiments using the mathematical model at least partially by providing inputs to the mathematical model, changing input values to the mathematical model, and iteratively instructing the mathematical model to run a computational experiment and to return at least one output of the computational experiment and wherein the atomic context does not alter the mathematical model;

a plurality of derived contexts that each have the same abstract data type as an atomic context and is configured to cause the performance of at least one computation at least partially by invoking at least one other context; and, a results store processor configured to:

receive at least one input into a data processing algorithm;

initiate, using the data processing algorithm, a number of queries to a result store within a base context;

receive, at the data processing algorithm, responses to the queries from the result store; and summarize the responses and produce an output based on the summarized responses.

12. The reasoning system of claim 11, wherein the results store processor is a derived context.

13. The reasoning system of claim 12, wherein the data processing algorithm of the results store processor is configured to perform an extremize operation in order to produce outputs that indicate a case whose results are closest to a best case.

14. The reasoning system of claim 12, wherein the data processing algorithm of the results store processor is configured to perform a regret operation in order to produce outputs indicating, for a given case, a degree of difference from a best case.

15. The reasoning system of claim 12, wherein the data processing algorithm of the results store processor is configured to perform a nearest neighbor operation in order to determine k records in the results store whose inputs are closest to an input for which the nearest neighbor result store processor is computing a result and to produce an output that is the weighted average of the outputs of the k closest cases.

16. The reasoning system of claim 12, wherein the data processing algorithm of the results store processor is configured to perform a statistical operation in order to produce an output that is a statistical value derived from data in the results store.

17. A method of driving a computational experiment, the method comprising:

providing a reasoning system comprising at least one atomic context and at least one derived context;

wherein the at least one atomic context has an abstract data type and comprises:

a reference to at least one mathematical model that defines a computational experiment and that computes answers to the computational experiment, wherein the mathematical model is located externally to the atomic context and is capable of computing answers to the computational experiment without being associated with the atomic context;

at least one interface to the mathematical model; and at least one method configured to run operations on the mathematical model;

wherein the atomic context is configured to drive experiments using the mathematical model at least partially by providing inputs to the mathematical model, changing input values to the mathematical model, and iteratively instructing the mathematical model to run a computational experiment and to return at least one output of the computational experiment and wherein the atomic context does not alter the mathematical model;

wherein the at least one derived context has the same abstract data type as an atomic context and is at least partially based on a base context, the derived context being configured to invoke the base context, to provide at least one input to the base context, and to receive at least one output from the base context;

invoking a derived context;

invoking, by the derived context, the base context upon which the derived context is based;

providing, by the derived context, at least one input to the base context; performing, by the base context, at least one computation;

providing, by the base context, at least one output to the derived context; and returning, by the derived context, at least one output of the derived context.

18. The method of claim 17, wherein the performing of at least one computation by the base context comprises invoking another base context.

19. The method of claim 17, further comprising transforming, by the derived context, the at least one output provided by the base context.

20. The method of claim 17, wherein providing the at least one input to the base context includes providing at least one input produced by the derived context by the application of at least one transformation to at least one input of the derived context.

* * * * *